(12) United States Patent
Sato et al.

(10) Patent No.: US 10,850,431 B2
(45) Date of Patent: Dec. 1, 2020

(54) CONVEYANCE DEVICE AND CONVEYANCE HEAD

(71) Applicants: Toshiba Kikai Kabushiki Kaisha, Tokyo (JP); Teijin Limited, Osaka (JP)

(72) Inventors: Kazuhito Sato, Gotemba (JP); Chiaki Shigematsu, Shizuoka (JP); Hodaka Yokomizo, Osaka (JP); Tetsuya Yoneda, Osaka (JP); Akihiko Obata, Osaka (JP)

(73) Assignees: SHIBAURA MACHINE CO., LTD., Tokyo (JP); TEIJIN LIMITED, Osaka (JP)

( * ) Notice: Subject to any disclaimer, the term of this patent is extended or adjusted under 35 U.S.C. 154(b) by 290 days.

(21) Appl. No.: 15/830,884

(22) Filed: Dec. 4, 2017

(65) Prior Publication Data

US 2018/0169901 A1   Jun. 21, 2018

(30) Foreign Application Priority Data

Dec. 16, 2016   (JP) .................................. 2016-244129

(51) Int. Cl.
| | |
|---|---|
| *B29C 31/04* | (2006.01) |
| *B29B 13/02* | (2006.01) |
| *B29C 31/08* | (2006.01) |
| *B29C 43/34* | (2006.01) |
| *B29C 43/04* | (2006.01) |

(Continued)

(52) U.S. Cl.
CPC ............ *B29C 31/04* (2013.01); *B29B 13/022* (2013.01); *B29B 13/023* (2013.01); *B29C 31/08* (2013.01); *B29C 43/04* (2013.01); *B29C 43/34* (2013.01); *B29C 31/085* (2013.01); *B29C 70/54* (2013.01); *B29C 2035/0283* (2013.01);

(Continued)

(58) Field of Classification Search
CPC ...... B29C 31/04; B29B 13/022; B29B 13/023
See application file for complete search history.

(56) References Cited

U.S. PATENT DOCUMENTS 6,022,208 A * 2/2000 Padovani ................ B29C 31/00
425/403.1
2009/0146440 A1   6/2009 Buljo et al.
(Continued)

FOREIGN PATENT DOCUMENTS

| CN | 104011273 | 8/2014 |
|---|---|---|
| CN | 108367466 | 8/2018 |

(Continued)

OTHER PUBLICATIONS

International Search Report in Application No. PCT/JP2016/067430 dated Jul. 26, 2016.

(Continued)

*Primary Examiner* — Jacob T Minskey
*Assistant Examiner* — Melody Tsui
(74) *Attorney, Agent, or Firm* — DLA Piper LLP US

(57) ABSTRACT

A conveyance device includes a plurality of holding mechanisms and one or more pressing mechanisms, the holding mechanisms each include a holder that holds a molding material and a holder movement mechanism that moves the holder, and the pressing mechanisms each include a pusher that comes into contact with and pushes the molding material and a pusher movement mechanism that moves the pusher.

16 Claims, 9 Drawing Sheets

(51) Int. Cl.
   *B29C 35/02* (2006.01)
   *B29C 70/54* (2006.01)
   *B29K 101/12* (2006.01)
   *B29K 105/06* (2006.01)

(52) U.S. Cl.
   CPC .. *B29C 2043/3405* (2013.01); *B29K 2101/12* (2013.01); *B29K 2105/06* (2013.01)

(56) References Cited

U.S. PATENT DOCUMENTS

| | | |
|---|---|---|
| 2013/0317161 A1 | 11/2013 | Konagai et al. |
| 2014/0148072 A1 | 5/2014 | Nagakura et al. |
| 2014/0246810 A1 | 9/2014 | Kato et al. |
| 2016/0194468 A1 | 7/2016 | Ogasawara et al. |
| 2018/0304556 A1 | 10/2018 | Reinhold et al. |
| 2018/0345429 A1 | 12/2018 | Doll |
| 2018/0361632 A1 | 12/2018 | Yokomizo et al. |

FOREIGN PATENT DOCUMENTS

| | | | |
|---|---|---|---|
| DE | 3843342 A1 * | 6/1990 | ............. B29C 43/34 |
| EP | 2626181 | 8/2013 | |
| EP | 3045489 | 7/2016 | |
| EP | 3392012 | 10/2018 | |
| JP | 58-191980 | 12/1983 | |
| JP | S59-015525 | 1/1984 | |
| JP | S61-72542 U | 5/1986 | |
| JP | H03-066632 | 6/1991 | |
| JP | H11-115015 | 4/1999 | |
| JP | 2008-254438 | 10/2008 | |
| JP | 4631395 | 2/2011 | |
| JP | 2011-168009 | 9/2011 | |
| JP | 2014-051035 | 3/2014 | |
| JP | 2014-051077 | 3/2014 | |
| JP | 2014-124834 A | 7/2014 | |
| JP | 2014-168864 | 9/2014 | |
| JP | 2016-083838 | 5/2016 | |
| JP | 2016-087959 A | 5/2016 | |
| WO | WO2012/105080 | 8/2012 | |
| WO | WO 2015/037570 | 3/2015 | |
| WO | WO 2017/104857 | 6/2017 | |

OTHER PUBLICATIONS

Written Opinion in Application n Application No. PCT/JP2016/067430 dated Jul. 26, 2016.
CD-ROM of specification and drawings annexed to the request of Japanese Utility Model Application No. 012362/1992 (Laid-open No. 074813/1993); Ishihara Heater Seizo Kabushiki Kaisha; Oct. 12, 1993; paragraphs [0015] to [0023].
File History of U.S. Appl. No. 16/062,187 retried on May 27, 2020.
European Search Report EP 16875831.6 dated Nov. 21, 2018.
European Examination Report EP 16875831 dated Dec. 11, 2018.
Chinese Office Action CN Application No. 201680073987.7 dated Aug. 1, 2019.
International Search Report and Written Opinion for PCT/JP2016/088600 dated Apr. 4, 2017.
International Preliminary Report on Patentability for PCT/JP2016/088600 dated Jun. 28, 2018.
Japanese Office Action in Application No. 2016-244129 dated Oct. 6, 2020.

* cited by examiner

STATE BEFORE SLIDING

STATE AFTER SLIDING

FIRST MODIFICATION

SECOND MODIFICATION

THIRD MODIFICATION

CONVEYANCE DEVICE AND CONVEYANCE HEAD

CROSS-REFERENCE TO RELATED APPLICATION

This application claims priority to Japanese Application No. JP 2016-244129 filed on Dec. 16, 2016. The contents of the above-identified application are incorporated herein by reference.

BACKGROUND OF THE INVENTION

Field of the Invention

The present invention relates to a conveyance device and a conveyance head, and more particularly, it relates to a conveyance device and a conveyance head both used for press molding of a molding material containing reinforcement fibers and a thermoplastic resin.

Description of the Background Art

In recent years, a fiber-reinforced resin molded body made of a fiber-reinforced resin containing reinforcement fibers and a thermoplastic resin has various excellent characteristics such as specific strength, specific rigidity, resistance to fatigue, and vibration damping, and hence it is used in a wide range of fields including daily necessities, sports applications, automobiles, and aerospace applications. Most of these are likely to be molded into a desired product shape by various molding methods and thereafter undergo processing such as secondary processing to become a finished product in order to satisfy the required characteristics of a product. Thus, research and development have been extensively conducted on various techniques for molding and processing a fiber-reinforced resin molded body.

In general, devices used for press molding using the aforementioned fiber-reinforced resin as a molding material have been proposed. Such devices used for press molding using a fiber-reinforced resin as a molding material are disclosed in Japanese Patent Publication Nos. 2014-051077 and 2014-168864, for example.

Japanese Patent Publication No. 2014-051077 discloses a device that molds a preform by pressing a prepreg (molding material) containing reinforcement fibers and a resin with preform molds. In this device, the prepreg is heated and softened, and then placed in the opened preform molds, the preform molds are closed, and pressure is applied to mold the preform, and the preform having a predetermined shape is obtained. Thereafter, the obtained preform is placed in molds for main molding, and pressed into a press-molded body.

Japanese Patent Publication No. 2014-168864 discloses a device that moves a base material to bring the base material into contact with a lower mold and performs preforming into a shape that follows the concavo-convex shape (inflected portions) of the mold on the base material in a state where the base material (molding material) is held by pins (a top support pin and a bottom support pin) between an upper mold and the lower mold, and then closes the molds.

However, in the device disclosed in Japanese Patent Publication No. 2014-051077, the molding material is brought into contact with the preform molds, and molded into the preform, and hence the preform molds conduct heat away from the molding material. Therefore, the resin flowability of the molding material disadvantageously decreases, and the press moldability of the molding material disadvantageously decreases in the main molding. In Japanese Patent Publication No. 2014-168864, the molding material is supported between the upper mold and the lower mold by being held by a plurality of pins, but pins for deforming the molding material into the shape that follows the concavo-convex shape (inflected portions) of the mold also hold the molding material therebetween. When the inflected portions of the molding material are held by the pins from the time point of support, the pins unnecessarily conduct heat away from the portions of the molding material that correspond to the inflected portions of the mold, where a decrease in the resin flowability should be minimized, and the press moldability of the molding material disadvantageously decreases. Furthermore, in the devices disclosed in Japanese Patent Publication Nos. 2014-168864 and 2014-168864, in addition to a device that molds the preform or performs preforming, a device that conveys the molding material between the upper mold and the lower mold is necessary, and the structure for conveying the molding material and for molding the preform or performing preforming disadvantageously becomes complicated.

SUMMARY OF THE INVENTION

The present invention has been proposed in order to solve the aforementioned problems, and an object of the present invention is to provide a conveyance device and a conveyance head each capable of efficiently conveying a molding material and performing preforming with a simple structure while significantly reducing or preventing heat conduction away from the molding material.

A conveyance device according to a first aspect of the present invention is a conveyance device that supports a melted and softened molding material containing reinforcement fibers and a thermoplastic resin, conveys the molding material between a pair of molds that have been opened, and places the molding material on one of the pair of molds, and includes a plurality of holding mechanisms and one or more pressing mechanisms. The holding mechanisms each include a holder that holds the molding material and a holder movement mechanism that moves the holder, and the pressing mechanisms each include a pusher that comes into contact with and pushes the molding material and a pusher movement mechanism that moves the pusher. When the thermoplastic resin in the molding material containing the reinforcement fibers and the thermoplastic resin is a crystalline thermoplastic resin, the melted and softened state denotes a state where the molding material is heated to the melting point or higher of the crystalline thermoplastic resin, and the crystalline thermoplastic resin is flowable, and when the thermoplastic resin in the molding material containing the reinforcement fibers and the thermoplastic resin is a non-crystalline thermoplastic resin, it denotes a state where the molding material is heated to the glass-transition point or higher of the non-crystalline thermoplastic resin, and the non-crystalline thermoplastic resin is softened and flowable. Preforming denotes molding (deforming) the molding material into a predetermined shape to follow the molds before press molding with the molds.

In this conveyance device according to the first aspect, as hereinabove described, the holding mechanisms each are provided with the holder that holds the molding material and the holder movement mechanism that moves the holder, and the pressing mechanisms each are provided with the pusher that comes into contact with and pushes the molding material and the pusher movement mechanism that moves the pusher. The holding mechanisms and the pressing mechanisms are provided separately from each other such that it is possible to separate the pusher from the molding material at times other than the preforming, and hence it is possible to prevent the pusher from conducting heat away from the molding material until the preforming is performed. Therefore, the pusher does not unnecessarily conduct heat away from portions of the molding material that correspond to inflected portions of the mold, where a decrease in the resin flowability should be minimized, and hence the press moldability of the molding material does not decrease.

Furthermore, the conveyance device conveys the molding material between the pair of molds that have been opened, and both the holding mechanisms and the pressing mechanisms are provided in the conveyance device such that the conveyance device can efficiently convey the molding material and perform the preforming on the molding material with a simple structure, as compared with the case where a conveyance structure and both the holding mechanisms and the pressing mechanisms are provided in separate devices.

Thus, the conveyance device can significantly reduce or prevent a decrease in the resin flowability of the portions of the molding material that correspond to the inflected portions of the mold and can efficiently convey the molding material and perform the preforming on the molding material with a simple structure, and hence it is possible to improve the moldability in press-molding. Consequently, it is possible to manufacture press-molded bodies with high precision (press-molded bodies with good appearance).

Furthermore, the conveyance device can directly press the molding material by the pressing mechanisms while supporting the molding material, and hence the conveyance device can perform the preforming in a state where the molding material does not come into contact with the mold. Thus, press molding can be performed immediately after the molding material, on which the preforming has been performed, is placed on the mold, and hence it is possible to improve the moldability in press-molding. Consequently, it is possible to manufacture press-molded bodies with high precision (press-molded bodies with good appearance).

The aforementioned conveyance device according to the first aspect preferably further includes a controller that controls an operation of conveying the molding material and an operation of placing the molding material, and the controller preferably controls the holding mechanisms to hold each portion of the molding material by a plurality of the holders and convey the molding material between the pair of molds while supporting the molding material in a state where the pusher does not come into contact with the molding material, controls the holding mechanisms and the pressing mechanisms to start preforming for pushing the molding material held by the plurality of holders by the pusher to follow the one of the pair of molds and deforming the molding material into a predetermined shape before the molding material comes into contact with the one of the pair of molds, and controls the holding mechanisms to release holding of the molding material, on which the preforming has been performed, by the holders and place the molding material on the one of the pair of molds. According to this structure, the controller controls the timing of various operations such that the plurality of holders support the molding material by holding each portion of the molding material in a state where the pusher does not come into contact with the molding material until the molding material is conveyed between the pair of molds, and hence it is possible to prevent the pusher from conducting heat away from the molding material even during the conveyance.

The aforementioned conveyance device according to the first aspect preferably further includes a conveyance device body and a conveyance head attached to the conveyance device body and provided with the plurality of holding mechanisms and the one or more pressing mechanisms. According to this structure, both the holding mechanisms and the pressing mechanisms are provided on the conveyance head, and hence interlocking between the holding mechanisms and the pressing mechanisms can be smoothly performed, and the operating time required to mold one press-molded body can be reduced. Therefore, unnecessary heat release from the molding material is significantly reduced or prevented, and hence a decrease in the temperature of the molding material can be significantly reduced or prevented. Consequently, it is possible to manufacture press-molded bodies with good appearance (press-molded bodies with high precision).

In this case, the conveyance head preferably includes a head body having a mesh-like framework structure to which the plurality of holding mechanisms and the one or more pressing mechanisms are attached. According to this structure, the weight of the head body can be reduced, and hence the load on the conveyance device body can be reduced when the head body operates. Therefore, the conveying operation speed of the head body (conveyance head) can be further increased, and hence the operating time required to mold one press-molded body can be reduced. Thus, unnecessary heat release from the molding material is significantly reduced or prevented, and hence a decrease in the temperature of the molding material can be significantly reduced or prevented. Consequently, it is possible to manufacture press-molded bodies with better appearance (press-molded bodies with higher precision).

In the aforementioned structure in which the conveyance head includes the head body, the head body preferably includes an attachment provided in a vicinity of an edge of the head body having the mesh-like framework structure and attached to the conveyance device body. According to this structure, the attachment is provided in the vicinity of the edge of the head body such that only the head body can enter between the molds (the upper mold and the lower mold), and the conveyance device body can be prevented from entering between the molds (the upper mold and the lower mold), and hence a distance of mold opening (a separation distance between the upper mold and the lower mold) can be minimized. Therefore, the time required for the mold opening operation can be reduced, and hence the operating time required to mold one press-molded body can be reduced. Thus, unnecessary heat release from the molding material is significantly reduced or prevented, and hence a decrease in the temperature of the molding material can be significantly reduced or prevented. Consequently, it is possible to manufacture press-molded bodies with better appearance (press-molded bodies with higher precision).

In the aforementioned structure in which the head body includes the attachment, the conveyance device body or the attachment preferably includes a joint, and the head body is preferably attached to the conveyance device body via the joint. According to this structure, the head body is attached to the conveyance device body via the joint, and hence the head body can be flexibly moved over a wide range with respect to the conveyance device body. Accordingly, the molding material, on which the preforming has been performed, can be smoothly placed on one of the pair of molds.

In the aforementioned structure further including the conveyance device body and the conveyance head, the holder movement mechanism preferably includes a holder rotation restriction mechanism that restricts rotation of the holder about a direction in which the holder is moved by the holder movement mechanism and maintains an orientation of the holder in a predetermined direction, and the pusher movement mechanism preferably includes a pusher rotation restriction mechanism that restricts rotation of the pusher about a direction in which the pusher is moved by the pusher movement mechanism and maintains an orientation of the pusher in a predetermined direction. According to this structure, the respective orientations of the holder and the pusher are maintained by the holder rotation restriction mechanism and the pusher rotation restriction mechanism such that positional deviation of the holder and the pusher with respect to the molding material can be significantly reduced or prevented.

In the aforementioned structure further including the conveyance device body and the conveyance head, the holding mechanisms provided on the conveyance head are preferably larger in number than the pressing mechanisms provided on the conveyance head. According to this structure, the molding material can be securely held by the holding mechanisms 5, which are larger in number than the pressing mechanisms.

In the aforementioned structure further including the conveyance device body and the conveyance head, the conveyance device body is preferably an articulated robot. According to this structure, it is possible to appropriately convey the molding material via various conveyance paths according to press-molded bodies having various shapes.

In the aforementioned conveyance device according to the first aspect, each of the holder movement mechanism and the pusher movement mechanism preferably includes a pneumatic cylinder. According to this structure, the holder and the pusher can be linearly reciprocated by simple structures using the pneumatic cylinders. Furthermore, the weight of the conveyance head can be reduced by using the pneumatic cylinders, and hence the load on the conveyance device body can be reduced when the head body operates. Consequently, the conveying operation speed of the head body (conveyance head) can be further increased.

In the aforementioned conveyance device according to the first aspect, the holding mechanisms each preferably include a slide mechanism that slides the holder in a direction that intersects with a direction in which the holder is moved by the holder movement mechanism. According to this structure, the holder is slid by the slide mechanism such that a distance between the holder and the pusher can be adjusted, and hence excessive thinning of the molding material caused by excessive pulling of the molding material at the time of the preforming can be significantly reduced or prevented. Consequently, it is possible to manufacture press-molded bodies with higher precision.

In this case, the slide mechanism preferably includes a pneumatic cylinder. According to this structure, the holder can be linearly reciprocated by a simple structure using the pneumatic cylinder in the direction that intersects with the direction in which the holder is moved by the holder movement mechanism. Furthermore, the weight of the conveyance head can be reduced by using the pneumatic cylinder, and hence the load on the conveyance device body can be reduced when the head body operates. Consequently, the conveying operation speed of the head body (conveyance head) can be further increased.

In the aforementioned structure in which the holding mechanisms each includes the slide mechanism, the plurality of holding mechanisms preferably include a first holding mechanism including a first holder and a first slide mechanism that slides the first holder in a first direction, a second holding mechanism including a second holder and a second slide mechanism that slides the second holder in a second direction substantially perpendicular to the first direction in a planar view, and a third holding mechanism including a third holder and a third slide mechanism that slides the third holder in a third direction different from the first direction and the second direction in the planar view. According to this structure, the molding material can be slid in the two directions substantially perpendicular to each other and in the direction different from the two directions substantially perpendicular to each other in the planar view, and hence preforming into a complicated shape such as a shape having overlapping portions can be performed on the molding material.

In the aforementioned conveyance device according to the first aspect, the pusher preferably has a spherical shape, a conical shape, a pyramidal shape, a rod shape, or a plate shape. According to this structure, the preforming can be performed also on the molding material having a more complicated shape by the pusher having any of these shapes.

In the aforementioned conveyance device according to the first aspect, the holder preferably includes one or more holding needles that hold the molding material by sticking into the molding material. According to this structure, the holding needles with smaller contact areas (contact areas between the holder and the molding material) can hold the molding material as compared with the case where flat surfaces are brought into contact with the molding material to hold the molding material, and hence it is possible to more effectively, significantly reduce or prevent heat conduction of the holder away from the molding material. Consequently, even in the case of a press-molded body having a complicated shape, it is possible to significantly reduce or prevent heat conduction away from the molding material and to manufacture press-molded bodies with good appearance (press-molded bodies with high precision).

In this case, the holder preferably includes a plurality of the holding needles, and the plurality of holding needles are preferably disposed symmetrically with respect to a centerline of the holder that extends in a direction in which the holder is moved by the holder movement mechanism. According to this structure, it is possible to evenly apply a force to the molding material when the holder holds the molding material, and hence it is possible to significantly reduce or prevent positional deviation of the molding material and elongation of the molding material caused by the positional deviation.

In the aforementioned conveyance device according to the first aspect, the holding needles are preferably arcuate, and are preferably arcuately pivotable. According to this structure, the holding needles pivot and stick into the molding material, and hence the holding needles are less likely to come off from the molding material, and can more reliably hold the molding material.

A conveyance head according to a second aspect of the present invention is a conveyance head that supports a melted and softened molding material containing reinforcement fibers and a thermoplastic resin, and includes a plurality of holding mechanisms and one or more pressing mechanisms. The holding mechanisms each include a holder that holds the molding material and a holder movement mechanism that moves the holder, and the pressing mechanisms each include a pusher that comes into contact with and pushes the molding material and a pusher movement mechanism that moves the pusher.

In this conveyance head according to the second aspect, as hereinabove described, the holding mechanisms each are provided with the holder that holds the molding material and the holder movement mechanism that moves the holder, and the pressing mechanisms each are provided with the pusher that comes into contact with and pushes the molding material and the pusher movement mechanism that moves the pusher. The holding mechanisms and the pressing mechanisms are provided separately from each other such that it is possible to separate the pusher from the molding material at times other than preforming, and hence it is possible to prevent the pusher from conducting heat away from the molding material until the preforming is performed. Therefore, the pusher does not unnecessarily conduct heat away from portions of the molding material that correspond to inflected portions of the mold, where a decrease in the resin flowability should be minimized, and hence the press moldability of the molding material does not decrease.

Furthermore, the conveyance head conveys the molding material between the pair of molds that have been opened, and both the holding mechanisms and the pressing mechanisms are provided on the conveyance head such that the conveyance head can efficiently convey the molding material and perform the preforming on the molding material with a simple structure, as compared with the case where a conveyance structure and both the holding mechanisms and the pressing mechanisms are provided in separate devices.

Thus, the conveyance head can significantly reduce or prevent a decrease in the resin flowability of the portions of the molding material that correspond to the inflected portions of the mold and can efficiently convey the molding material and perform the preforming on the molding material with a simple structure, and hence it is possible to improve the moldability in press-molding. Consequently, it is possible to manufacture press-molded bodies with high precision (press-molded bodies with good appearance).

Furthermore, the conveyance head can directly press the molding material by the pressing mechanisms while supporting the molding material, and hence the conveyance head can perform the preforming in a state where the molding material does not come into contact with the mold. Thus, press molding can be performed immediately after the molding material, on which the preforming has been performed, is placed on the mold, and hence it is possible to improve the moldability in press-molding. Consequently, it is possible to manufacture press-molded bodies with high precision (press-molded bodies with good appearance).

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is hereinafter described with reference to the drawings.

A conveyance device 100*a* according to the embodiment is now described with reference to FIGS. 1 to 9. The conveyance device 100*a* is a component of a press system 100.

(Structure of Press System)

Figure 1:
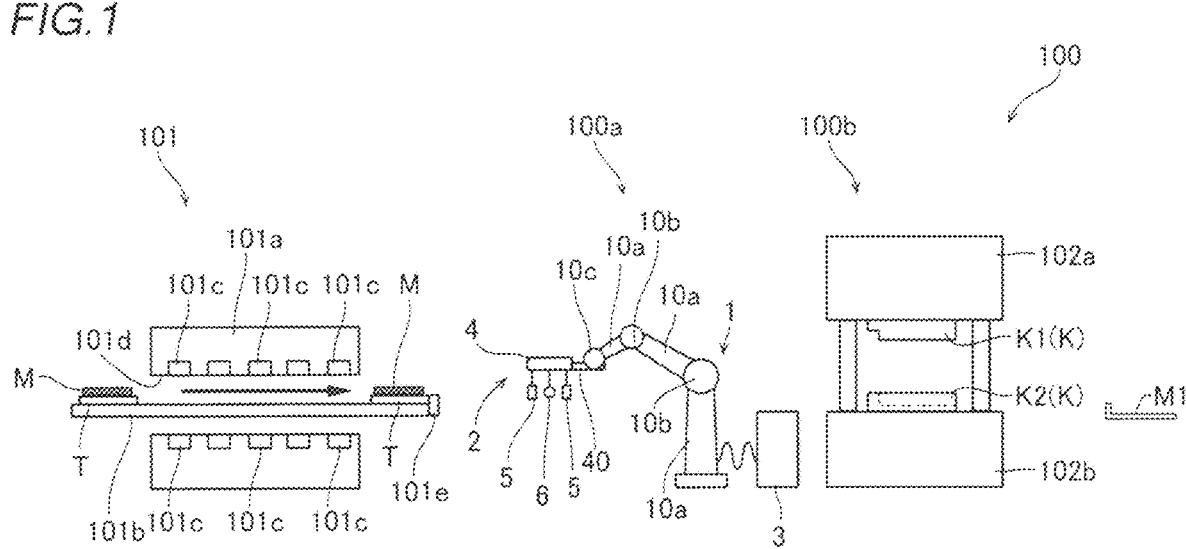
FIG. 1 is a schematic view showing the overall structure of a conveyance system including a conveyance device according to an embodiment.

The press system 100 shown in FIG. 1 is used to mold a press-molded body M1 having a complicated shape of a molding material M containing reinforcement fibers and a thermoplastic resin. Specifically, the press system 100 is used to manufacture components of automobiles, for example. With this press system 100, a large number of press-molded bodies M1 can be molded at low cost.

The press system 100 includes the conveyance device 100*a* and a press device 100*b* to which a pair of molds K (an upper mold K1 and a lower mold K2) can be attached. Furthermore, the press system 100 may include a heating device 101 provided upstream of the conveyance device 100*a*. Molding by the press system 100 mainly includes three steps of a conveying step, a preforming step, and a press molding step (main molding step). The conveying step and the preforming step are performed by the conveyance device 100*a*. The press molding step is performed by the press device 100*b*. A heating step for heating the molding material M to a melted and softened state before the conveying step is performed by the heating device 101.

Specifically, the press system 100 conveys the molding material M, which has been heated to the melted and softened state by the heating device 101 (heating step), to the press device 100*b* (between the upper mold K1 and the lower mold K2) by the conveyance device 100*a* (conveying step). Furthermore, the press system 100 performs preforming on the conveyed molding material M (or the molding material M being conveyed) by the conveyance device 100*a* (preforming step). In addition, the press system 100 molds the press-molded body M1 by press-molding (mold-closing), by the press device 100*b* (press molding step), the molding material M on which the preforming has been performed.

The melted and softened state denotes a state where the molding material M is melted and softened, and is flowable. More specifically, when the thermoplastic resin in the molding material M containing the reinforcement fibers and the thermoplastic resin is a crystalline thermoplastic resin, the melted and softened state denotes a state where the molding material M is heated to the melting point or higher of the crystalline thermoplastic resin, and the crystalline thermoplastic resin is flowable, and when the thermoplastic resin in the molding material M containing the reinforcement fibers and the thermoplastic resin is a non-crystalline thermoplastic resin, it denotes a state where the molding material M is heated to the glass-transition point or higher of the non-crystalline thermoplastic resin, and the non-crystalline thermoplastic resin is softened and flowable.

The preforming is molding performed prior to the press molding, and denotes molding (deforming) the melted and softened, developed, and flat sheet-shaped molding material M before molding into a predetermined shape to follow the molds K before the press molding with the molds K. When the melted and softened molding material M is placed on the mold K without performing the preforming on the molding material M, and the press molding is performed, the flowability of the molding material M does not keep up with a change in the shape of the molding material M caused by the molds K, and problems such as thin-walled portions and wrinkles may occur partially in the press-molded body M1 obtained by the press molding. In order to prevent these problems, preforming for preliminarily deforming the molding material M to match the shape and contour of the molds K is performed before the press molding.

(Molds)

Figure 2:
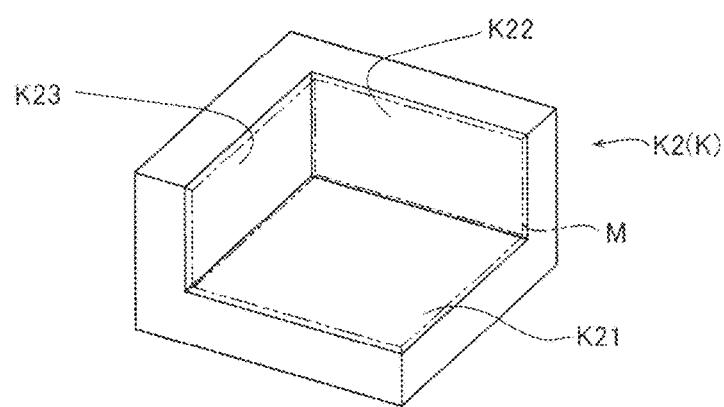
FIG. 2 is a perspective view showing a lower mold according to the embodiment.

As shown in FIG. 2, the lower mold K2 includes surfaces K21 to K23 in three directions that intersect with each other, for example. The molding material M is brought into contact with the surfaces K21 to K23 in the three directions and placed on the lower mold K2 by the conveyance device 100a. In FIG. 2, the molding material M after the preforming is shown by a two-dot chain line. The molding material M is deformed from a flat shape (sheet shape) to a three-dimensional shape along the surfaces K21 to K23 by the preforming. Furthermore, inflected portions (bent portions) of the three-dimensional molding material M after the preforming are molded by pushing their adjacent portions by pushers 61a to 61c described below during the preforming. In the molds K, pipes (not shown) with pressurized water as a heating medium are installed for temperature adjustment. Due to the pipes, the temperature of the molds K is adjusted to 150 degrees, for example.

(Molding Material)

The molding material M used to mold the press-molded body M1 in the press system 100 shown in FIG. 1 is now described.

As described above, the molding material M contains the reinforcement fibers and the thermoplastic resin. In short, the molding material M is a material in which the reinforcement fibers and the thermoplastic resin are integrated. Specifically, the molding material M includes a material molded into a sheet by integrating a fiber-reinforced mat as the reinforcement fibers and the thermoplastic resin, a material molded into a sheet by dispersing discontinuous fibers as the reinforcement fibers in the thermoplastic resin, etc. According to this embodiment, the thickness of the molding material M containing the reinforcement fibers is about 1 to 5 mm, for example.

The reinforcement fibers are fibers to be added to the thermoplastic resin for the purpose of enhancing the strength of the molding material M, for example. That is, the reinforcement fibers are reinforcing fibers for reinforcing the molding material M. The reinforcement fibers are properly selected according to the use of the press-molded body M1, for example, and the material thereof is not particularly restricted. Inorganic fibers or organic fibers can be employed as the reinforcement fibers according to this embodiment. Examples of inorganic fibers include carbon fibers, glass fibers, tungsten carbide fibers, ceramic fibers, alumina fibers, boron fibers, natural fibers, mineral fibers, metal fibers, etc. Examples of organic fibers include fibers produced from resin materials such as polyacryl, polyamide, and polyolefin.

When discontinuous carbon fibers (carbon fibers) are employed as the reinforcement fibers, the weight average fiber length thereof is preferably in the range of 2 mm to 500 mm. More preferably, the weight average fiber length thereof is in the range of 5 mm to 100 mm. Still more preferably, the weight average fiber length thereof is in the range of 10 mm to 30 mm. The weight average fiber length denotes a value obtained by $\Sigma(L1 \times W)/\Sigma W$ where L1 represents the length of the fibers, W represents the weight of the fibers, and L2 ($=\Sigma L1$) represents the entire length of the N fibers.

The thermoplastic resin is properly selected according to the use of the press-molded body M1, for example, and the material thereof is not particularly restricted. Examples of the thermoplastic resin include polyolefin resins such as a polyethylene resin and a polypropylene resin, polystyrene resins, polyamide resins, polyester resins, polycarbonate resins, acrylic resins, etc.

(Heating Device)

The heating device 101 shown in FIG. 1 is a device that heats the molding material M to the melted and softened state. The heating device 101 includes a heating device body 101a, a conveyor 101b, and a plurality of heaters 101c.

The heating device body 101a is provided with a passage 101d that passes through the heating device body 101a, and the conveyor 101b passes through the passage 101d. The plurality of heaters 101c are disposed along the conveyor 101b on the inner surface of the heating device body 101a that defines the passage 101d. On one end (entrance) of the conveyor 101b, a tray T, on which the developed molding material M before heat treatment is placed, is placed. The molding material M is heated to the melted and softened state by the plurality of heaters 101c while being moved from one end (entrance) to the other end (exit) by the conveyor 101b. The molding material M heated by the heating device 101 has a sheet shape (flat shape).

The conveyor 101b includes a movement restriction portion 101e fixedly provided at the other end (exit). The movement restriction portion 101e comes into contact with the molding material M (tray T) moved by the conveyor 101b to restrict the movement of the molding material M so as to stop the molding material M at a predetermined position. The predetermined position where the molding material M is stopped by the movement restriction portion 101e is a position where the molding material M is a position where the molding material M is held by the conveyance device 100a (holders 50a to 50g described below). In short, the movement restriction portion 101e positions the molding material M with respect to the conveyance device 100a.

(Press Device)

The press device 100b shown in FIG. 1 is a device to which the pair of molds K (the upper mold K1 and the lower mold K2) can be attached. The press device 100b includes an upper board 102a capable of moving up and down, to which the upper mold K1 is fixed, and a fixed lower board 102b to which the lower mold K2 is fixed. That is, the press device 100b is a so-called vertical closing molding machine that moves the mold K (upper mold K1) in an upward-downward direction. The upper mold K1 has a convex shape, and the lower mold K2 has a concave shape that corresponds to the shape of the upper mold K1. The press device 100b performs press molding on the molding material M, on which the preforming has been performed by the conveyance device 100a, placed on the lower mold K2 by the conveyance device 100a, to mold the press-molded body M1.

(Conveyance Device)

The conveyance device 100a shown in FIG. 1 includes an articulated robot 1 and a conveyance head 2 attached to the articulated robot 1. Furthermore, the articulated robot 1 is provided with a controller 3 that controls the articulated robot 1 and the conveyance head 2. The articulated robot 1 is an example of a "conveyance device body" in the claims.

The articulated robot 1 is a device that moves the conveyance head 2. Specifically, the articulated robot 1 is a device that moves the conveyance head 2 to a position (holding position) where the conveyance head 2 can hold the molding material M heated by the heating device 101 and a position (molding position) between the molds K where press molding is performed on the molding material M. A base of the articulated robot 1 is fixedly installed on a floor surface.

Figure 3:
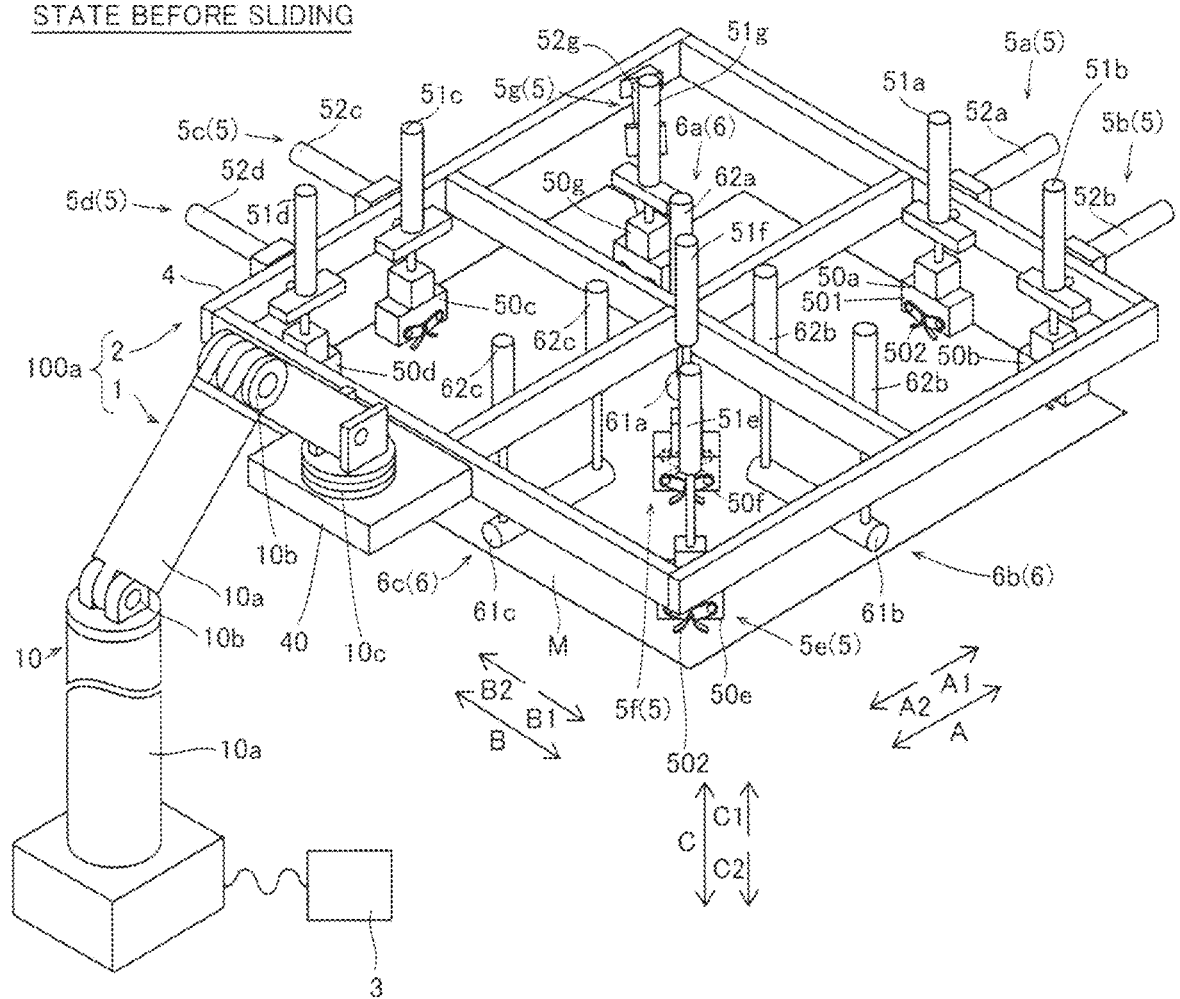
FIG. 3 is a perspective view showing the conveyance device before sliding according to the embodiment.

As shown in FIG. 3, the articulated robot 1 includes an arm 10. The arm 10 includes a plurality of rod-like link members 10a and an intermediate joint 10b that connects the link members 10a to each other. In addition, the arm 10 includes a distal-end joint 10c (which may include a robot hand) connected to an attachment 40, described below, of the conveyance head 2 (head body 4) at the distal end. The distal-end joint 10c attaches the conveyance head 2 to the articulated robot 1 such that the conveyance head 2 is freely rotatable both in a vertical direction and in a horizontal direction. The distal-end joint 10c is an example of a "joint" in the claims.

The conveyance head 2 includes the head body 4, a plurality of holding mechanisms 5 (5a, 5b, 5c, 5d, 5e, 5f, and 5g), and a plurality of pressing mechanisms 6 (6a, 6b, and 6c). The holding mechanisms 5 and the pressing mechanisms 6 are attached to the head body 4.

(Head Body)

As shown in FIG. 3, the head body 4 has a rectangular outer shape. Furthermore, the head body 4 has a mesh-like (grid-like) framework structure. Specifically, the head body 4 is in the form of a mesh (grid) in which an orthogonal cruciform beam material is disposed inside a rectangular frame, and an inner region of the rectangular frame is equally divided into four. Due to this mesh-like framework structure, the weight of the conveyance head 2 held by the articulated robot 1 is reduced.

Note that a direction in which one side of the rectangular frame extends is a direction A, and a direction in which the other side that intersects with one side extending in the direction A extends is a direction B. In addition, a direction substantially perpendicular to the directions A and B is illustrated as a direction C (roughly vertical direction). When the molding material M is conveyed, the head body 4 is moved in such a posture that the direction A and the direction B are substantially along the horizontal direction and the direction C is substantially along the vertical direction. The direction A is an example of a "first direction" in the claims. The direction B is an example of a "second direction" in the claims.

The head body 4 is provided with the attachment 40 to be attached to the articulated robot 1. The head body 4 is attached to the articulated robot 1 via the distal-end joint 10c of the articulated robot 1. The attachment 40 is provided in the vicinity of an edge of the head body 4 having a mesh-like framework structure. Specifically, the attachment 40 is provided adjacent to the edge (rectangular frame) of the head body 4 having a framework structure.

(Holding Mechanism)

As shown in FIGS. 3 to 6, the plurality of holding mechanisms 5 (5a, 5b, 5c, 5d, 5e, 5f, and 5g) include holders 50 (50a, 50b, 50c, 50d, 50e, 50f, and 50g) and holder movement mechanisms 51 (51a, 51b, 51c, 51d, 51e, 51f, and 51g) that move the holders 50 in the direction C, respectively. The holders 50a and 50b are examples of a "first holder" in the claims. The holders 50c and 50d are examples of a "second holder" in the claims. The holder 50g is an example of a "third holder" in the claims.

Figure 6:
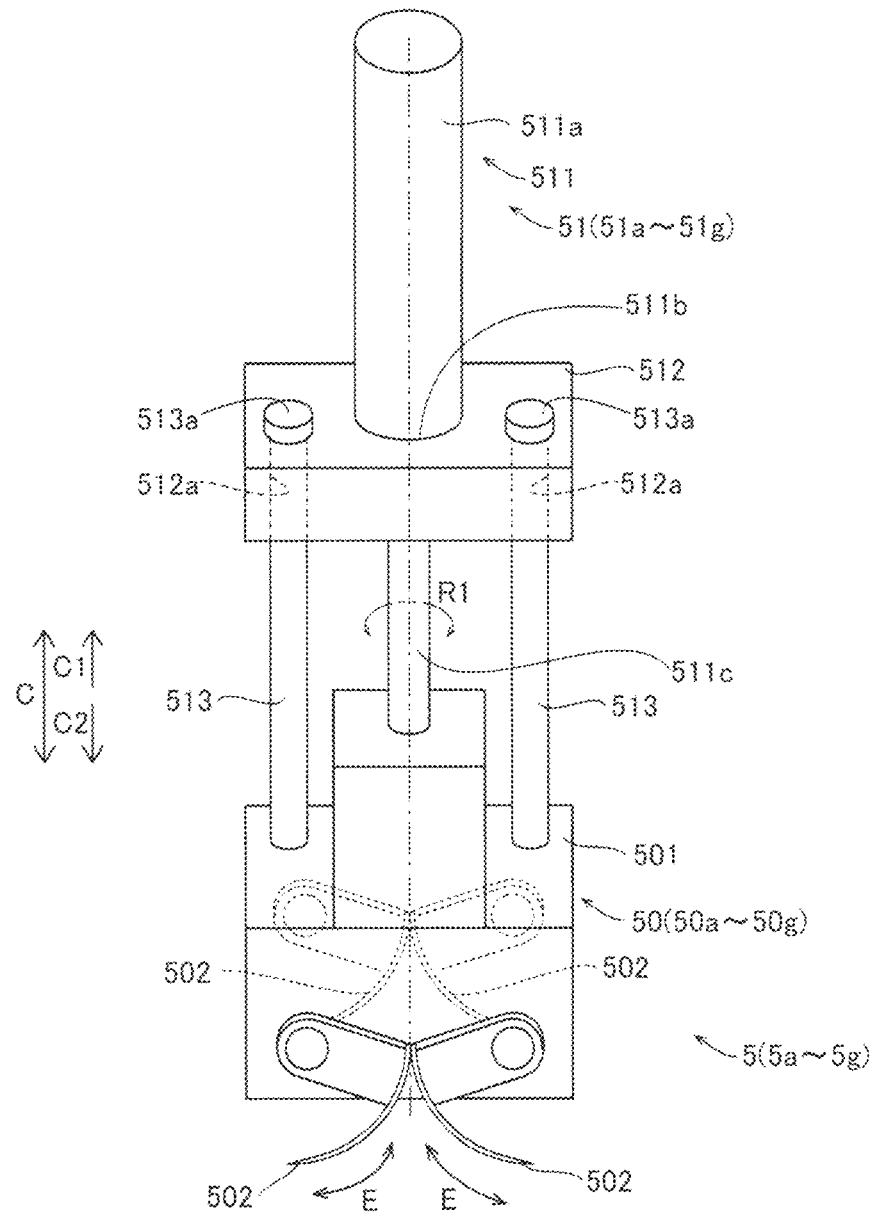
FIG. 6 is a perspective view showing a holding mechanism of the conveyance device according to the embodiment.

As shown in FIG. 6, the holder movement mechanisms 51 (51a, 51b, 51c, 51d, 51e, 51f, and 51g) each include a pneumatic cylinder 511.

The pneumatic cylinder 511 includes a cylinder tube 511a and a piston rod 511c that extends from a piston (not shown) that reciprocates due to supply and exhaust of compressed air inside the cylinder tube 511a, protrudes from a base 511b of the cylinder tube 511a, and reciprocates in synchronism with the piston.

The holders 50 each are attached to a tip (an end on the side opposite to the piston, an end on the direction C2 side) of the piston rod 511c.

The holder movement mechanisms 51 each further include a cylinder block 512 to which the base 511b of the cylinder tube 511a is attached. The cylinder block 512 includes through-holes 512a on both sides of the attaching position of the cylinder tube 511a in the same direction as the reciprocating direction of the piston rod 511c. That is, one through-hole 512a is provided on each side of the attaching position of the cylinder tube 511a.

The holder movement mechanisms 51 each further include guide bars 513. One guide bar 513 is inserted in each of the two through-holes 512a of the cylinder block 512. The guide bars 513 are examples of a "holder rotation restriction mechanism" in the claims.

The guide bars 513 include stoppers 513a each having a shape larger than the cross-section of the through-hole 512a at their one ends (ends on the cylinder tube 511a side, ends on the direction C1 side). Furthermore, the holders 50 (holder bodies 501 described below) each are attached to the other ends (ends on the direction C2 side) of the guide bars 513.

The cylinder block 512 is disposed in a plane on which the head body 4 extends. The pneumatic cylinder 511 can move the holder 50 in the direction C. That is, the pneumatic cylinder 511 can linearly reciprocate the holder 50 in the direction C toward the molding material M.

Figure 7:
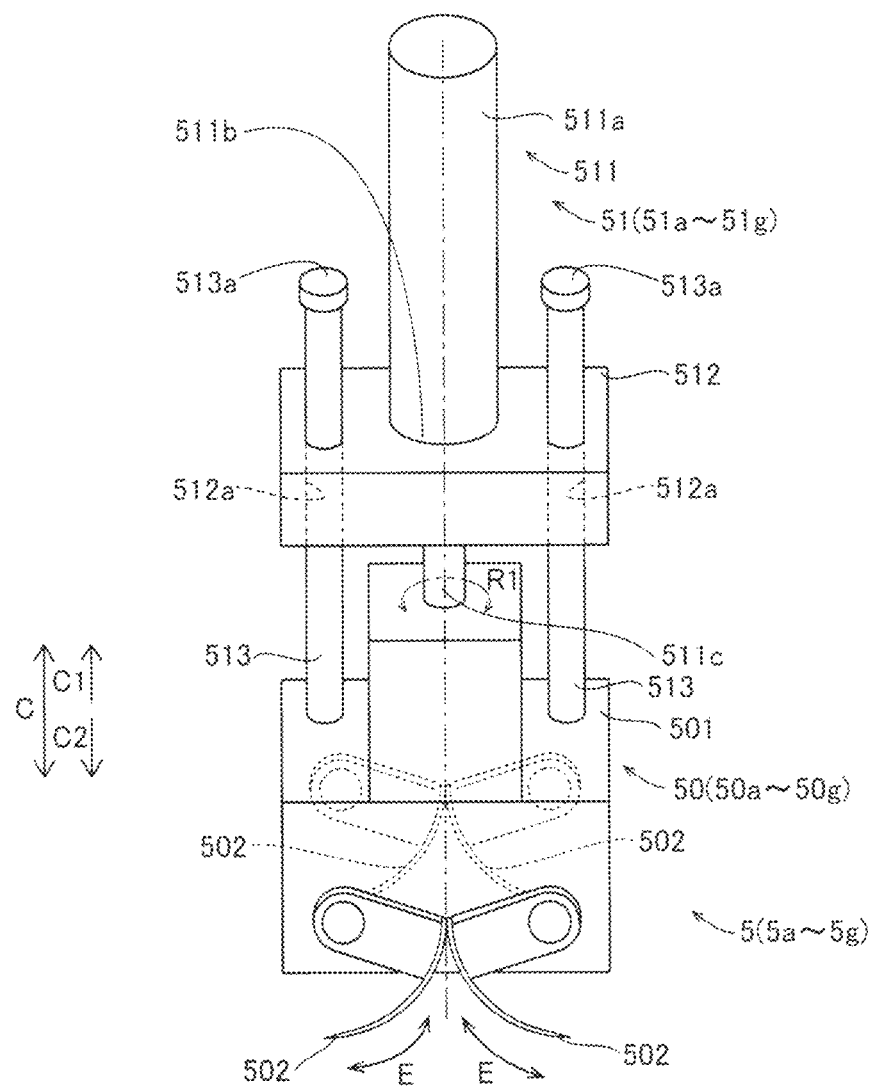
FIG. 7 is a perspective view for illustrating movement of the holding mechanism of the conveyance device according to the embodiment.
Figure 8:
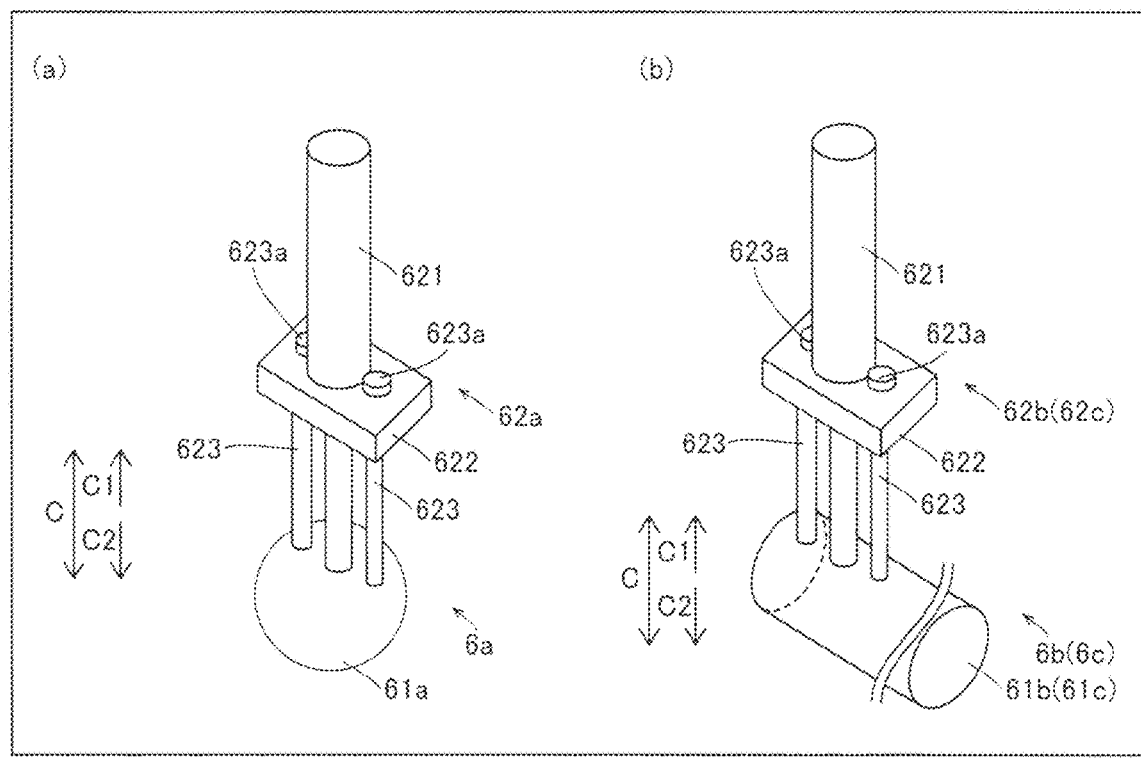
FIG. 8 is a perspective view showing a pressing mechanism of the conveyance device according to the embodiment.

The stoppers 513a regulate the stroke (the amount of movement) when the compressed air is supplied to the pneumatic cylinder 511, and the piston rod 511c protrudes from the cylinder tube 511a. Furthermore, the stoppers 513a regulate the amount of reciprocation of the holder 50. When the piston rod 511c protrudes to move the holder 50, the guide bars 513, one ends of which are attached to the holder 50, are also pulled by the holder 50 to protrude from the cylinder block 512. When the stoppers 513a come into contact with the cylinder block 512 on the direction C2 side (when a state shown in FIG. 7 is changed to a state shown in FIG. 6), the holder 50 stops.

The guide bars 513 guide the holder 50 such that the holder 50 is not inclined with respect to the reciprocating direction (a direction in which the piston rod 511c protrudes, the direction C) of the holder 50.

The guide bars 513 also have a function of preventing rotation of the holder 50 about the reciprocating direction (the direction in which the piston rod 511c protrudes, the direction C) of the holder 50. For example, when the piston rod 511c rotates about its own central axis (in a direction R1), the holder 50 attached to the tip of the piston rod 511c also rotates, and the orientation of the holder 50 changes. The guide bars 513 restrict this rotation and maintain the orientation of the holder 50 in a predetermined direction (a direction in which the holder 50 is moved in the direction C by the holder movement mechanism 51).

The number (seven in total) of the holding mechanisms 5a to 5g provided on the conveyance head 2 is larger than the number (three in total) of pressing mechanisms 6a to 6c provided on the conveyance head 2 described below.

Figure 4:
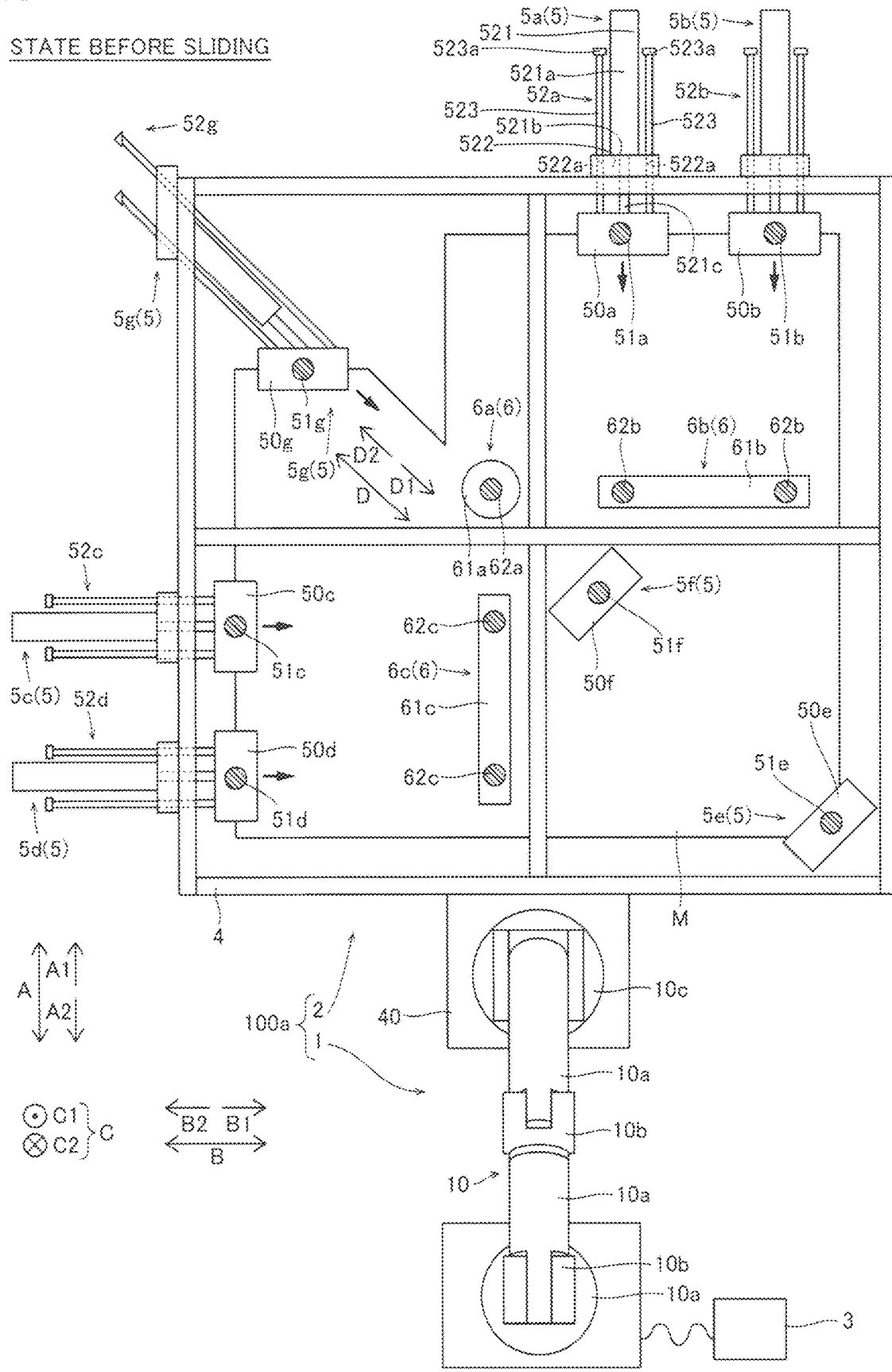
FIG. 4 is a plan view showing the conveyance device before sliding according to the embodiment.
Figure 5:
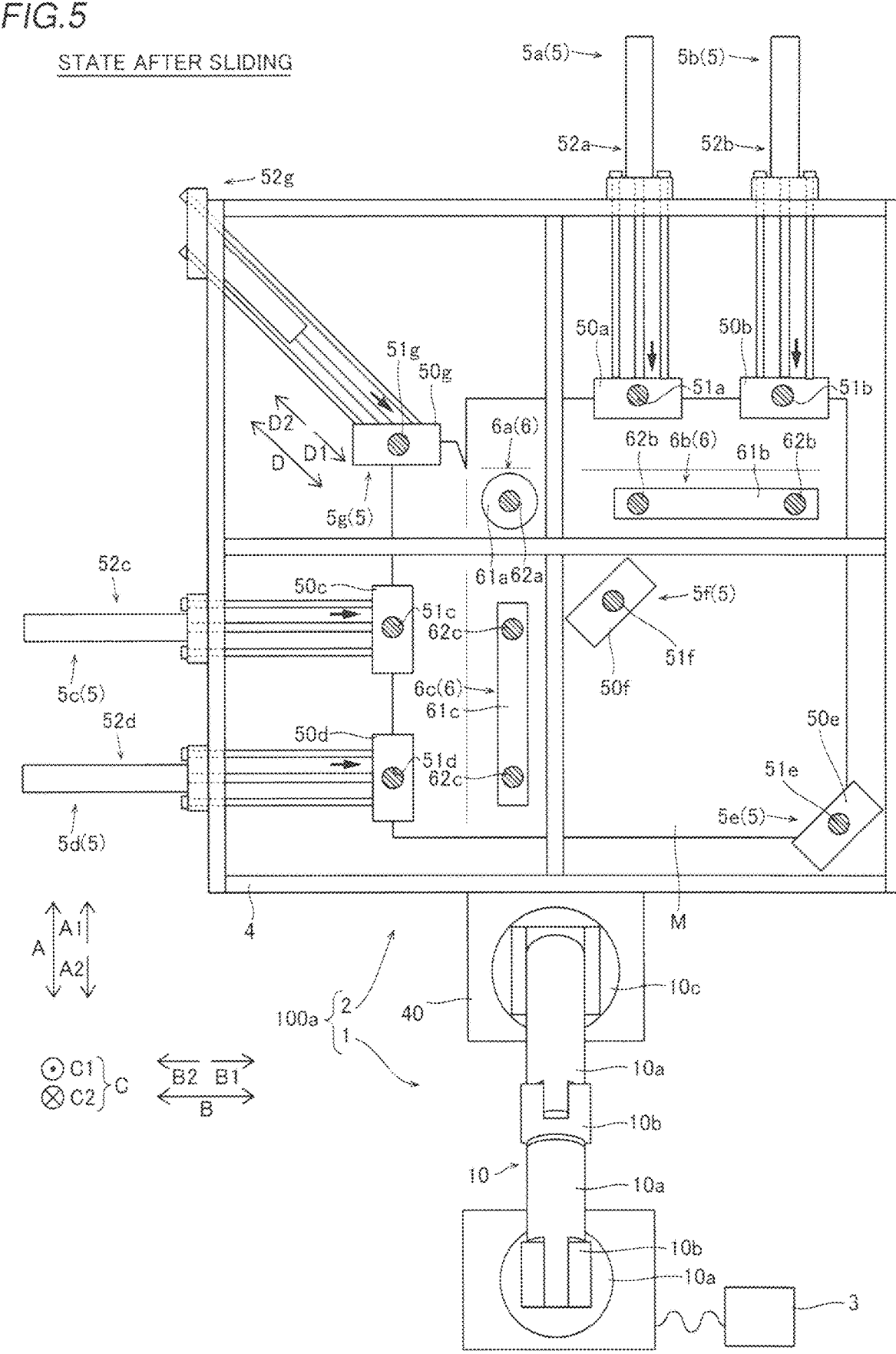
FIG. 5 is a plan view showing the conveyance device after sliding according to the embodiment.

As shown in FIG. 6, each of the holding mechanisms 5a to 5g includes the guide bars 513. In FIGS. 3 to 5, illustration of the guide bars 513 is omitted for the sake of convenience.

Each of the holding mechanisms 5a to 5e grasps and holds an edge of the sheet-shaped molding material M before the preforming. In addition, the holding mechanisms 5a to 5e are disposed so as to be distributed substantially evenly on the edge of the molding material M. Furthermore, the holding mechanisms 5f and 5g grasp and hold the vicinity of the center of the molding material M. The molding material M has an outer shape slightly smaller than that of the head body 4 in a planar view (as viewed in the direction C). A corner of the molding material M on the direction A1 side and the direction B2 side is cut out. The molding material M is held on the direction C2 side of the head body 4.

The holding mechanisms 5a and 5b are disposed in a region in a direction A1 and a direction B1 of the four inner regions of the head body 4. The holding mechanisms 5c and 5d are disposed in a region in a direction A2 and a direction B2 of the four inner regions of the head body 4. The holding mechanisms 5e and 5f are disposed in a region in the direction A2 and the direction B1 of the four inner regions of the head body 4. The holding mechanism 5g is disposed in a region in the direction A1 and the direction B2 of the four inner regions of the head body 4.

The holding mechanisms 5a and 5b partially hold the molding material M that comes into contact with the surface K22 (see FIG. 2) of the lower mold K2 due to the preforming. The holding mechanisms 5c and 5d partially hold the molding material M that comes into contact with the surface K23 (see FIG. 2) of the lower mold K2 due to the preforming. The holding mechanisms 5e, 5f, and 5g partially hold the molding material M that comes into contact with the surface K21 (see FIG. 2) of the lower mold K2 due to the preforming.

Each of the holders 50a to 50g includes the holder body 501, a plurality (four in total) of holding needles (open eye needles) 502 pivotably attached to the holder body 501, and a holding needle drive mechanism (not shown) disposed inside the holder body 501.

As shown in FIG. 6, each of the holding needles 502 sticks into the molding material M to engage with the molding material M. The holding needles 502 each are in the form of an elongated circular cone (a tapered shape having a circular cross-section). Furthermore, the holding needles 502 each are quarter arcuate (π/2 arcuate), and are arcuately pivotable in a direction E by the holding needle drive mechanism. The holding needle drive mechanism includes a pneumatic cylinder (not shown) or the like.

The holding needles 502 are provided in pairs, and one pair of holding needles 502 are aligned in the same straight line, and move (pivot) in a direction away from each other in the same straight line to stick into the molding material M. Thus, the holding needles 502 hold the molding material M while significantly reducing or preventing occurrence of wrinkles on the molding material M. One pair of holding needles 502 of each of the holding mechanisms 5a to 5d and 5g are aligned in a direction in which the edge of the molding material M extends.

A plurality of holding needles 502 provided on one holder 50 (50a to 50g) are disposed symmetrically with respect to a centerline of the holder 50 (50a to 50g) that extends in a direction (direction C) in which the holder 50 (50a to 50g) is moved by the holder movement mechanism 51 (51a to 51g). In short, the plurality of holding needles 502 are attached in a well-balanced manner to the holder body 501.

The thickness of the holding needles 502 is preferably not more than twice the thickness of the molding material M. This is because when the thickness of the holding needles 502 is more than twice the thickness of the molding material M, it is difficult to stick the holding needles 502 into the molding material M and securely lift (hold) the molding material M.

By way of example, the holding needles 502 are made of a spring steel material (SUP10). Furthermore, by way of example, the holding needles 502 are prepared by dividing a circular wire rod having a wire diameter of 2 mm φ (thickness) and a diameter of 40 mm into four, and then polishing one end in a needle shape. The holding needles 502 are preferably arcuate needles having an approximate curvature radius not less than the thickness of the molding material M+5 mm and not more than 40 times the thickness of the molding material M. The holding needles 502 are more preferably arcuate needles having an approximate curvature radius not less than the thickness of the molding material M+8 mm and not more than 20 times the thickness of the molding material M. The holding needles 502 are still more preferably arcuate needles having an approximate curvature radius not less than the thickness of the molding material M+10 mm and not more than 15 times the thickness of the molding material M.

In order to significantly reduce or prevent adherence of a portion (melted thermoplastic resin) of the molding material M to the holding needles 502 when the holding needles 502 release holding of the molding material M, at least a portion of a tip of each of the holding needles 502 is preferably subjected to a surface treatment. The surface treatment includes coating with various mold release agents and coating with a fluorine resin such as polytetrafluoroethylene (PTFE). Due to this surface treatment, the durability and peeling effect of the holding needles 502 are improved.

(Slide Mechanism)

As shown in FIGS. 4 and 5, the holding mechanisms 5a, 5b, 5c, 5d, and 5g of the plurality of holding mechanisms 5 (5a, 5b, 5c, 5d, 5e, 5f, and 5g) include slide mechanisms 52 (52a, 52b, 52c, 52d, and 52g) that move (slide) the holders 50a, 50b, 50c, 50d, and 50g along a plane (a plane that extends in the direction A and the direction B) on which the head body 4 extends, respectively.

The slide mechanisms 52 each include a pneumatic cylinder 521. The slide mechanisms 52a to 52d and 52g have the same structure as each other, and hence the slide mechanism 52a shown in FIG. 4 is described as a representative with reference numerals.

The pneumatic cylinder 521 includes a cylinder tube 521a and a piston rod 521c that extends from a piston (not shown) that reciprocates due to supply and exhaust of compressed air inside the cylinder tube 521a, protrudes from a base 521b of the cylinder tube 521a, and reciprocates in synchronism with the piston.

The slide mechanisms 52 each further include a cylinder block 522 to which the base 521b of the cylinder tube 521a is attached. The cylinder block 522 is attached to the head body 4. The cylinder block 512 of the holder movement mechanism 51 is attached to a tip (an end on the side opposite to the pneumatic cylinder 521) of the piston rod 521c. Therefore, when the pneumatic cylinder 521 reciprocates, the holder movement mechanism 51 and the holder 50 synchronously move (slide) along the plane on which the head body 4 extends.

The cylinder block 522 includes through-holes 522a on both sides of the attaching position of the cylinder tube 521a in the same direction as the reciprocating direction of the piston rod 521c. That is, one through-hole 522a is provided on each side of the attaching position of the cylinder tube 521a.

The slide mechanisms 52 each further include guide bars 523. One guide bar 523 is inserted in each of the two through-holes 522a of the cylinder block 522.

The guide bars 523 include stoppers 523a each having a shape larger than the cross-section of the through-hole 522a at their one ends on the cylinder block 522 side. Furthermore, the other ends of the guide bars 523 are attached to the cylinder block 512 of the holder movement mechanism 51.

The stoppers 523a regulate the stroke (the amount of movement) when the compressed air is supplied to the pneumatic cylinder 521, and the piston rod 521c protrudes from the cylinder tube 521a. Furthermore, the stoppers 523a regulate the amount of sliding of the holder 50. When the piston rod 521c protrudes to slide the holder 50, the guide bars 523, one ends of which are attached to the holder 50, are also pulled by the holder 50 to protrude from the cylinder block 522. When the stoppers 523a come into contact with the cylinder block 522, the holder 50 stops.

The guide bars 523 guide the holder 50 such that the holder 50 is not inclined with respect to the sliding direction (a direction in which the piston rod 521c protrudes) of the holder 50.

The guide bars 523 also have a function of preventing rotation of the holder 50 about the reciprocating direction (the direction in which the piston rod 521c protrudes) of the holder 50. For example, when the piston rod 521c rotates about its own central axis, the holder 50 attached to the tip of the piston rod 521c also rotates, and the orientation of the holder 50 changes. The guide bars 523 restrict this rotation and maintain the orientation of the holder 50 in the predetermined direction.

As shown in FIGS. 4 and 5, the holding mechanisms 5a and 5b include the slide mechanisms 52a and 52b that slide the holders 50a and 50b in the direction A, respectively. That is, the slide mechanisms 52a and 52b are attached to the head body 4, and the holder movement mechanisms 51a and 51b are attached to the head body 4 via the slide mechanisms 52a and 52b. The sliding direction is generally a direction (roughly horizontal direction) substantially perpendicular to a direction (vertical direction) in which the pair of molds K (see FIG. 1) face each other.

The holding mechanisms 5c and 5d include the slide mechanisms 52c and 52d that slide the holders 50c and 50d in the direction B substantially perpendicular to the direction A in the planar view (as viewed in the direction C), respectively. That is, the slide mechanisms 52c and 52d are attached to the head body 4, and the holder movement mechanisms 51c and 51d are attached to the head body 4 via the slide mechanisms 52c and 52d.

The holding mechanism 5g includes the slide mechanism 52g that slides the holder 50g in a direction (direction D) different from the direction A and the direction B in the planar view (as viewed in the direction C). That is, the slide mechanism 52g is attached to the head body 4, and the holder movement mechanism 51g is attached to the head body 4 via the slide mechanism 52g. As described above, both the direction A and the direction B are directions in a roughly horizontal plane in a use state, but the direction D may be a direction in the horizontal plane or may be inclined from the direction in the horizontal plane.

The holding mechanisms 5e and 5f do not include a slide mechanism 52, and do not slide in the direction A or the direction B. The holding mechanisms 5e and 5f are attached to the head body 4. The holding mechanisms 5e and 5f reciprocate the holders 50e and 50f linearly in the direction C toward the molding material M by the holder movement mechanisms 51e and 51f.

(Pressing Mechanism)

As shown in FIGS. 8(a) and 8(b), the plurality of pressing mechanisms 6a, 6b, and 6c (6) include the pushers 61a, 61b, and 61c (61) and pusher movement mechanisms 62a, 62b, and 62c (62) that move the pushers 61, respectively. The pusher movement mechanisms 62a, 62b, and 62c include the same structure as each other, and hence the pusher movement mechanism 62a is described below as a representative.

The pusher movement mechanism 62a includes one pneumatic cylinder 621, one cylinder block 622, two guide bars 623, and two stoppers 623a. The pusher movement mechanism 62a is similar in structure to the holder movement mechanism 51, and hence a detailed description of the structure is omitted. Similarly to the holder movement mechanism 51 including a mechanism that restricts rotation of the holder 50 by the two guide bars 513, the pusher movement mechanism 62 also includes a mechanism that restricts rotation of the pusher 61 by the two guide bars 623. The pusher 61 is smaller than the holder 50, and hence when the two guide bars 623 cannot be attached directly to the pusher 61, a block may be inserted therebetween, and the pusher 61 may be attached to the pusher movement mechanism 62 via the block. In FIGS. 3 to 5, illustration of the guide bars 623 is omitted. The guide bars 623 are examples of a "pusher rotation restriction mechanism" in the claims.

The pressing mechanism 6a includes the pusher 61a. The pressing mechanism 6a further includes one pusher movement mechanism 62a that moves the pusher 61a in the direction C. The pusher 61a has a spherical shape. Furthermore, the pusher 61a is provided on an end of the pusher movement mechanism 62a on the direction C2 side.

The pressing mechanism 6b includes the pusher 61b. The pressing mechanism 6b further includes a pair of pusher movement mechanisms 62b that move the pusher 61b in the direction C. The pusher 61b has a round bar shape that extends in the direction B. The pusher 61b is connected to ends of the pair of pusher movement mechanisms 62b on the direction C2 side, and straddles the ends of the pair of pusher movement mechanisms 62b on the direction C2 side.

The pressing mechanism 6c includes the pusher 61c. The pressing mechanism 6c further includes a pair of pusher movement mechanisms 62c that move the pusher 61c in the direction C. The pusher 61c has a round bar shape that extends in the direction A. The pusher 61c is connected to ends of the pair of pusher movement mechanisms 62c on the direction C2 side, and straddles the ends of the pair of pusher movement mechanisms 62c on the direction C2 side.

The pusher 61a is disposed in the region in the direction A1 and the direction B2 of the four inner regions of the head body 4. The pusher 61b is disposed in the region in the direction A1 and the direction B1 of the four inner regions of the head body 4. The pusher 61c is disposed in the region in the direction A2 and the direction B2 of the four inner regions of the head body 4. All of the pushers 61a to 61c are disposed in the vicinity of the center of the molding material M in the planar view (as viewed in the direction C).

The spherical pusher 61a pushes, at the time of the preforming, a portion of the molding material M before the preforming that corresponds to a portion of the molding material M after the preforming in the vicinity of an intersection between the surface K21, the surface K22, and the surface K23, which is located on the lower mold K2. The round bar-shaped pusher 61b that extends in the direction B pushes, at the time of the preforming, a portion of the molding material M before the preforming that corresponds to a portion of the molding material M after the preforming in the vicinity of an intersection between the surface K21 and the surface K22, which is located on the lower mold K2. The round bar-shaped pusher 61c that extends in the direction A pushes, at the time of the preforming, a portion of the molding material M before the preforming that corresponds to a portion of the molding material M after the preforming in the vicinity of an intersection between the surface K21 and the surface K23, which is located on the lower mold K2.

The pushers 61a to 61c come into contact with the molding material M from the direction C1 side, and push the molding material M toward the direction C2 side. The pushers 61a to 61c are portions that directly come into contact with the molding material M, and hence the pushers 61a to 61c conduct heat away from the molding material M. Therefore, the thermal conductivities of at least portions that come into contact with the molding material M and their vicinities of the pushers 61a to 61c are preferably lower than the thermal conductivity of the molding material M. If the thermal conductivity of the pushers 61a to 61c is higher than the thermal conductivity of the molding material M, heat is conducted away from portions of the molding material M with which the pushers 61a to 61c come into contact, and the surface appearance of the press-molded body M1 (see FIG. 1) may deteriorate (wrinkles or the like may occur on the surface).

The pushers 61a to 61c are preferably quickly separated from the molding material M after completion of the preforming. In addition, a fluororesin such as polytetrafluoroethylene (PTFE) having a high heat resistance and a high chemical resistance and a low friction coefficient is preferably used as a material for the pushers 61a to 61c (in particular, portions of the pushers 61a to 61c that directly push the molding material M). The portions that push the molding material M denote the portions of the pushers 61a to 61c that come into contact with the molding material M and their vicinities. Coating of the pushers 61a to 61c may be applied to the entire outer surfaces of the pushers 61a to 61c, or only the portions of the pushers 61a to 61c that come into contact with the molding material M and their vicinities.

According to this embodiment, the pusher 61a is a sphere (may be a hemisphere) having a diameter of 40 mm, for example. Furthermore, the pusher 61b (pusher 61c) is a round bar having a longitudinal length of 150 mm and a diameter of 30 mm.

(Controller)

The controller 3 shown in FIG. 1 controls the conveyance device 100a to convey the molding material M and perform the preforming on the molding material M.

The controller 3 controls the holding mechanisms 5a to 5g to hold, by the holders 50a to 50g, each portion of the molding material M heated to the melted and softened state by the heating device 101 in a state where the pushers 61a to 61c do not come into contact with the molding material M. The controller 3 controls the holders 50a to 50g to hold (support) each portion of the molding material M, and controls the conveyance device 100a to convey the molding material M supported by the conveyance head 2 between the pair of molds K.

Furthermore, the controller 3 controls the holding mechanisms 5a to 5g and the pressing mechanisms 6a to 6c to start the preforming for pushing the molding material M held by the holders 50a to 50g by the pushers 61a to 61c to follow the lower mold K2 and deforming the molding material M into a predetermined shape before the molding material M comes into contact with the lower mold K2.

In addition, the controller 3 controls the holding mechanisms 5a to 5g to release holding of the molding material M after the preforming by the holders 50a to 50g and to place the molding material M on the lower mold K2.

(Preforming Operation Performed by Conveyance Device)

The operation of performing the preforming on the molding material M by the conveyance device 100a is now described with reference to FIGS. 3 to 5. FIGS. 3 and 4 show a state before the holders 50a to 50d and 50g slide. FIG. 5 shows a state after the holders 50a to 50d and 50g slide.

First, as shown in FIGS. 3 and 4, the molding material M supported by the conveyance head 2 by being held by the holding mechanisms 5a to 5g (holders 50a to 50g) in a state where the molding material M does not come into contact with the pushers 61a to 61c is conveyed between the pair of molds K (see FIG. 1) by the conveyance device 100a. At this time, the molding material M is supported by the holding mechanisms 5a to 5g of the conveyance head 2 so as not to come into contact with the pair of molds K.

Figure 9:
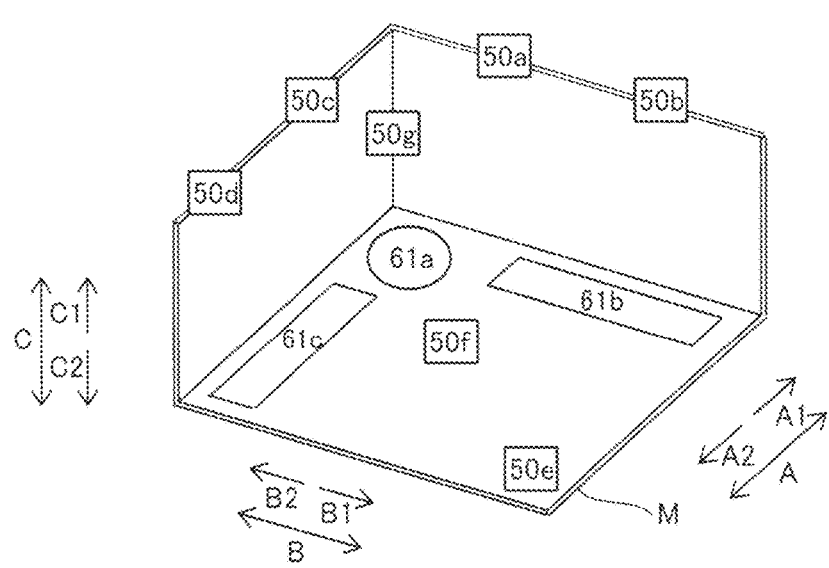
FIG. 9 is a perspective view showing a molding material after preforming by the conveyance device according to the embodiment.

As shown in FIG. 9, the slide mechanisms 52a to 52d and 52g slide the holders 50a to 50d and 50g together toward the center of the molding material M in the planar view. Due to this, each portion of the molding material M held by each of the holders 50a to 50d and 50g is also slid. FIG. 9 shows the positions of the pushers 61a to 61c and the holders 50a to 50g with respect to the molding material M placed on the lower mold K2 (see FIG. 1) after completion of the preforming.

Specifically, the holders 50a and 50b are slid in the direction A2 by the slide mechanisms 52a and 52b. Furthermore, the holders 50c and 50d are slid in the direction B1 (the direction perpendicular to the direction A2 in the planar view) by the slide mechanisms 52c and 52d. Furthermore, the holder 50g is slid in a direction D1 (a direction different from the direction A1 and the direction B1 in the planar view) by the slide mechanism 52g.

The sliding distance of the holder 50g that slides in the direction D1 is shorter than those of the holders 50a and 50b that slide in the direction A1. Thus, when the sliding speeds are the same as each other, the holder 50g that slides in the direction D1 reaches its target position (slide stop position) before the holders 50a and 50b that slide in the direction A1. Therefore, the portion of the molding material M held by the holder 50g that slides in the direction D1 forms an inner portion of the press-molded body M1 (see FIG. 1).

When the holder 50a that slides in the direction A1 reaches its target position (slide stop position), holding of the molding material M by the holder 50a is released.

In parallel with each sliding described above, the holders 50e to 50g are moved in the direction C2 (a direction toward the molding material M) by the holder movement mechanisms 51e to 51g.

In parallel with each sliding described above, the pushers 61b and 61c are moved in the direction C2 (the direction toward the molding material M) by the pusher movement mechanisms 62b and 62c.

At the time of completing each sliding described above (movement in the horizontal plane) and movement toward the molding material M (movement in the direction C2) and releasing holding of the molding material M by the holder 50a, the molding material M is still separated from the pair of molds K.

Then, holding of the molding material M by the holder 50g is released. At the same time, the pusher 61a is moved in the direction C2 (the direction toward the molding material M) by the pusher movement mechanism 62a. Thus, the molding material M is pushed simultaneously with coming into contact with the lower mold K2 such that lifting of the molding material M is prevented, and hence the mold material M can be brought into sufficiently close contact with the molds K.

Finally, all holding of the molding material M is released. That is, holding of the molding material M by the holders 50b to 50f is released. Thus, the molding material M is placed along the lower mold K2, as shown in FIG. 2.

Effects of this Embodiment

According to this embodiment, the following effects can be obtained.

According to this embodiment, as hereinabove described, the holding mechanisms 5 are provided with the holders 50a to 50g that hold the molding material M and the holder movement mechanisms 51a to 51g that move the holders 50e to 50g, and the pressing mechanisms 6 are provided with the pushers 61a to 61c that come into contact with and push the molding material M and the pusher movement mechanisms 62a to 62c that move the pushers 61a to 61c. The holding mechanisms 5 and the pressing mechanisms 6 are provided separately from each other such that it is possible to separate the pushers 61 from the molding material M at times other than the preforming, and hence it is possible to prevent the pushers 61 from conducting heat away from the molding material M until the preforming is performed. Therefore, the pushers 61 do not unnecessarily conduct heat away from portions of the molding material M that correspond to inflected portions of the mold K, where a decrease in the resin flowability should be minimized, and hence the press moldability of the molding material M does not decrease.

Furthermore, the conveyance device 100a conveys the molding material M between the pair of molds K that have been opened, and both the holding mechanisms 5 and the pressing mechanisms 6 are provided in the conveyance device 100a such that the conveyance device 100a can efficiently convey the molding material M and perform the preforming on the molding material M with a simple structure, as compared with the case where a conveyance structure and both the holding mechanisms 5 and the pressing mechanisms 6 are provided in separate devices.

Thus, the conveyance device 100a can significantly reduce or prevent a decrease in the resin flowability of the portions of the molding material M that correspond to the inflected portions of the mold K and can efficiently convey the molding material M and perform the preforming on the molding material M with a simple structure, and hence it is possible to improve the moldability in press-molding. Consequently, it is possible to manufacture press-molded bodies with high precision (press-molded bodies with good appearance).

Furthermore, the conveyance device 100a can directly press the molding material M by the pressing mechanisms 6 while supporting the molding material M, and hence the conveyance device 100a can perform the preforming in a state where the molding material M does not come into contact with the mold K. Thus, press molding can be performed immediately after the molding material M, on which the preforming has been performed, is placed on the mold K, and hence it is possible to improve the moldability in press-molding. Consequently, it is possible to manufacture press-molded bodies with high precision (press-molded bodies with good appearance).

According to this embodiment, as hereinabove described, the conveyance device 100a includes the controller 3 that controls the operation of conveying the molding material M and the operation of placing the molding material M, and the controller 3 controls the holding mechanisms 5 to hold each portion of the molding material M by a plurality of holders 50a to 50g and convey the molding material M between the pair of molds K while supporting the molding material M in a state where the pushers 61a to 61c do not come into contact with the molding material M, controls the holding mechanisms 5 and the pressing mechanisms 6 to start the preforming for pushing the molding material M held by the plurality of holders 50a to 50g by the pushers 61a to 61c to follow one of the molds K and deforming the molding material M into a predetermined shape before the molding material M comes into contact with one of the molds K, and controls the holding mechanisms 5 to release holding of the molding material M, on which the preforming has been performed, by the holders 50a to 50g and place the molding material M on one of the pair of molds K. Thus, the controller 3 controls the timing of various operations such that the plurality of holders 50 support the molding material M by holding each portion of the molding material M in a state where the pushers 61 do not come into contact with the molding material M until the molding material M is conveyed between the pair of molds K, and hence it is possible to prevent the pushers 61 from conducting heat away from the molding material M even during the conveyance.

According to this embodiment, as hereinabove described, the conveyance device 100a includes the articulated robot 1 and the conveyance head 2 attached to the articulated robot 1, to which the plurality of holding mechanisms 5 and one or more pressing mechanisms 6 are attached. Thus, both the holding mechanisms 5 and the pressing mechanisms 6 are provided on the conveyance head 2, and hence interlocking between the holding mechanisms 5 and the pressing mechanisms 6 can be smoothly performed, and the operating time required to mold one press-molded body M1 can be reduced. Therefore, unnecessary heat release from the molding material M is significantly reduced or prevented, and hence a decrease in the temperature of the molding material M can be significantly reduced or prevented. Consequently, it is possible to manufacture press-molded bodies M1 with good appearance (press-molded bodies M1 with high precision).

According to this embodiment, as hereinabove described, the head body 4 having a mesh-like framework structure to which the plurality of holding mechanisms 5 and one or more pressing mechanisms 6 are attached is provided on the conveyance head 2. Thus, the weight of the head body 4 can be reduced, and hence the load on the articulated robot 1 can be reduced when the head body 4 operates. Therefore, the conveying operation speed of the head body 4 (conveyance head 2) can be further increased, and hence the operating time required to mold one press-molded body M1 can be reduced. Thus, unnecessary heat release from the molding material M is significantly reduced or prevented, and hence a decrease in the temperature of the molding material M can be significantly reduced or prevented. Consequently, it is possible to manufacture press-molded bodies M1 with better appearance (press-molded bodies M1 with higher precision).

According to this embodiment, as hereinabove described, the head body 4 includes the attachment 40 provided in the vicinity of the edge of the head body 4 having a mesh-like (grid-like) framework structure and attached to the articulated robot 1. Thus, the attachment 40 is provided in the vicinity of the edge of the head body 4 such that only the head body 4 can enter between the molds K (the upper mold K1 and the lower mold K2), and the articulated robot 1 can be prevented from entering between the molds K (the upper mold K1 and the lower mold K2), and hence a distance of mold opening (a separation distance between the upper mold K1 and the lower mold K2) can be minimized. Therefore, the time required for the mold opening operation can be reduced, and hence the operating time required to mold one press-molded body M1 can be reduced. Thus, unnecessary heat release from the molding material M is significantly reduced or prevented, and hence a decrease in the temperature of the molding material M can be significantly reduced or prevented. Consequently, it is possible to manufacture press-molded bodies M1 with better appearance (press-molded bodies M1 with higher precision).

According to this embodiment, as hereinabove described, the articulated robot 1 includes the distal-end joint 10c, and the head body 4 is attached to the articulated robot 1 via the distal-end joint 10c. Thus, the head body 4 is attached to the articulated robot 1 via the distal-end joint 10c, and hence the head body 4 can be flexibly moved over a wide range with respect to the articulated robot 1. Accordingly, the molding material M, on which the preforming has been performed, can be smoothly placed on one of the pair of molds K.

According to this embodiment, as hereinabove described, the holder movement mechanisms 51a to 51g include the guide bars 513 that restrict rotation of the holders 50a to 50g about the direction in which the holders 50a to 50g are moved by the holder movement mechanisms 51a to 51g and maintain the orientations of the holders 50a to 50g in the predetermined directions, and the pusher movement mechanisms 62a to 62c include the guide bars 623 that restrict rotation of the pushers 61a to 61c about the direction in which the pushers 61a to 61c are moved by the pusher movement mechanisms 62a to 62c and maintain the orientations of the pushers 61a to 61c in the predetermined directions. Thus, the respective orientations of the holders 50a to 50g and the pushers 61a to 61c are maintained by the guide bars 513 and 623 such that positional deviation of the holders 50a to 50g and the pushers 61a to 61c with respect to the molding material M can be significantly reduced or prevented.

According to this embodiment, as hereinabove described, the number of the holding mechanisms 5 provided on the conveyance head 2 is larger than the number of the pressing mechanisms 6 provided on the conveyance head 2. Thus, the molding material M can be securely held by the holding mechanisms 5, which are larger in number than the pressing mechanisms 6.

According to this embodiment, as hereinabove described, the conveyance device 100a includes the articulated robot 1. Thus, it is possible to appropriately convey the molding material M via various conveyance paths according to press-molded bodies M1 having various shapes.

According to this embodiment, as hereinabove described, the pneumatic cylinders 511 and 621 are provided in the holding mechanisms 5 and the pressing mechanisms 6, respectively. Thus, the holders 50e to 50g and the pushers 61a to 61c can be linearly reciprocated by simple structures using the pneumatic cylinders 511 and 621. Furthermore, the weight of the conveyance head 2 can be reduced, and hence the load on the articulated robot 1 can be reduced when the head body 4 operates. Consequently, the conveying operation speed of the head body 4 (conveyance head 2) can be further increased.

According to this embodiment, as hereinabove described, the holding mechanisms 5 include the slide mechanisms 52a to 52d and 52g that slide the holders 50a to 50d and 50g in the directions that intersect with the direction in which the holders 50a to 50d and 50g are moved by the holder movement mechanisms 51a to 51d and 51g. Thus, the holders 50a to 50d and 50g are slid by the slide mechanisms 52a to 52d and 52g such that distances between the holders 50a to 50d and 50g and the pushers 61a to 61c can be adjusted, and hence excessive thinning of the molding material M caused by excessive pulling of the molding material M at the time of the preforming can be significantly reduced or prevented. Consequently, it is possible to manufacture press-molded bodies M1 with higher precision.

According to this embodiment, as hereinabove described, the pneumatic cylinders 521 are provided in the slide mechanisms 52a to 52d and 52g. Thus, the holders 50a to 50d and 50g can be linearly reciprocated by simple structures using the pneumatic cylinders 521 in the directions that intersect with the direction in which the holders 50a to 50d and 50g are moved by the pneumatic cylinders 511. Furthermore, the weight of the conveyance head 2 can be reduced, and hence the load on the articulated robot 1 can be reduced when the head body 4 operates. Consequently, the conveying operation speed of the head body 4 (conveyance head 2) can be further increased.

According to this embodiment, as hereinabove described, the holding mechanisms 5 include the holders 50a and 50b, the holders 50c and 50d, and the holder 50g, and further include the slide mechanisms 52a and 52b that slide the holders 50a and 50b in the direction A, the slide mechanisms 52c and 52d that slide the holders 50c and 50d in the direction B substantially perpendicular to the direction A in the planar view, and the slide mechanism 52g that slides the holder 50g in the direction D different from the direction A and the direction B in the planar view. Thus, the molding material M can be slid in the two directions substantially perpendicular to each other and in the direction different from the two directions substantially perpendicular to each other in the planar view, and hence preforming into a complicated shape such as a shape having overlapping portions can be performed on the molding material M.

According to this embodiment, as hereinabove described, the pusher 61a has a spherical shape, and the pushers 61b and 61c each have a round bar shape. Thus, the preforming can be performed also on the molding material M having a more complicated shape by the pushers 61a to 61c having various shapes.

According to this embodiment, as hereinabove described, one or more holding needles 502 that hold the molding material M by sticking into the molding material M are provided on the holders 50a to 50g. Thus, the holding needles 502 with smaller contact areas (contact areas between the holders and the molding material M) can hold the molding material M as compared with the case where flat surfaces are brought into contact with the molding material M to hold the molding material M, and hence it is possible to more effectively, significantly reduce or prevent heat conduction of the holders away from the molding material M. Consequently, even in the case of the press-molded body M1 having a complicated shape, it is possible to significantly reduce or prevent heat conduction away from the molding material M and to manufacture press-molded bodies M1 with good appearance (press-molded bodies M1 with high precision).

According to this embodiment, as hereinabove described, the plurality of holding needles 502 are provided on the holders 50, and the plurality of holding needles 502 are disposed symmetrically with respect to the centerlines of the holders 50a to 50g that extend in the direction in which the holders 50a to 50g are moved by the holder movement mechanisms 51a to 51g. Thus, it is possible to evenly apply a force to the molding material M when the holders 50a to 50g hold the molding material M, and hence it is possible to significantly reduce or prevent positional deviation of the molding material M and elongation of the molding material M caused by the positional deviation.

According to this embodiment, as hereinabove described, the holding needles 502 are arcuate, and are arcuately pivotable. Thus, the holding needles 502 pivot and stick into the molding material M, and hence the holding needles 502 are less likely to come off from the molding material M, and can more reliably hold the molding material M.

Results (Examples 1 to 3) obtained by actually conveying the molding material M and performing the preforming on the molding material M by the conveyance device 100a according to this embodiment, and performing press molding are now described.

Example 1

A base material to be a molding material containing carbon fibers having a weight average fiber length of 20 mm and a nylon 6 resin having a thickness equivalent to 2.5 mm in the state of a press-molded body (2.6 mm in the state of a molding material) was used. This base material was cut into the same shape as the shape of the molding material M shown by an outer line in FIG. 4, and was heated such that the surface temperature of the base material was 290° C. The arcuate needles at the tips of the holders were pivoted and inserted into the base material, and the conveyance device was moved upward to lift the heated base material. The cross-sections of the arcuate needles used at this time each are in the form of a circle having a diameter of 2 mm, and the surfaces thereof are coated with PTFE. The molding material having a thickness of 2.5 mm was lifted by the arcuate needles cut from the aforementioned wire rod having a diameter of 40 mm.

Then, after the conveyance device 100a that had lifted the base material was moved to 30 mm above the surface of the mold, the holders and the pushers were driven as described above to perform the preforming between the pair of molds that had been opened. Then, after the preforming was completed and the base material was placed on the mold, the molds were immediately closed and pressurized to perform press molding, and a press-molded body was obtained. At this time, the temperature of the molds was adjusted to 150° C., and molding was performed under a pressure of 20 MPa in terms of the projected area of the press-molded body in the opening and closing direction of the molds. The pressurization was maintained for 35 seconds, the molds were opened in a state where the temperature of the press-molded body became 180° C., and the press-molded body was taken out. Furthermore, this series of molding operations was repeated ten times, and it has been confirmed that this series of molding operations can be stably performed. Consequently, a good press-molded body not subjected to protrusion to the shear edges of the molds, a short due to sliding of the base material on the elevation surface, or opening of the mating surfaces was obtained. In addition, no wrinkles were observed on the surface of the obtained press-molded body.

Example 2

A base material to be a molding material containing carbon fibers having a weight average carbon fiber length of 10 mm and a nylon 6 resin having a thickness equivalent to 2.5 mm in the state of a press-molded body (2.6 mm in the state of a molding material) was used. Preforming and press molding were performed under the same conditions as those of Example 1 except for using this base material to mold a press-molded body. Consequently, a press-molded body as good as the press-molded body of Example 1 was obtained.

Example 3

Using a molding base material containing carbon fibers having a weight average carbon fiber length of 20 mm and a nylon 6 resin having a thickness equivalent to 3.5 mm in the state of a press-molded body (3.6 mm in the state of a molding material), preforming and press molding were performed under the same conditions as those of Example 1 except for this to mold a press-molded body. Consequently, a press-molded body as good as the press-molded body of Example 1 was obtained.

MODIFICATIONS

The embodiment disclosed this time must be considered as illustrative in all points and not restrictive. The range of the present invention is shown not by the above description of the embodiment but by the scope of claims for patent, and all modifications within the meaning and range equivalent to the scope of claims for patent are further included.

Figure 10:
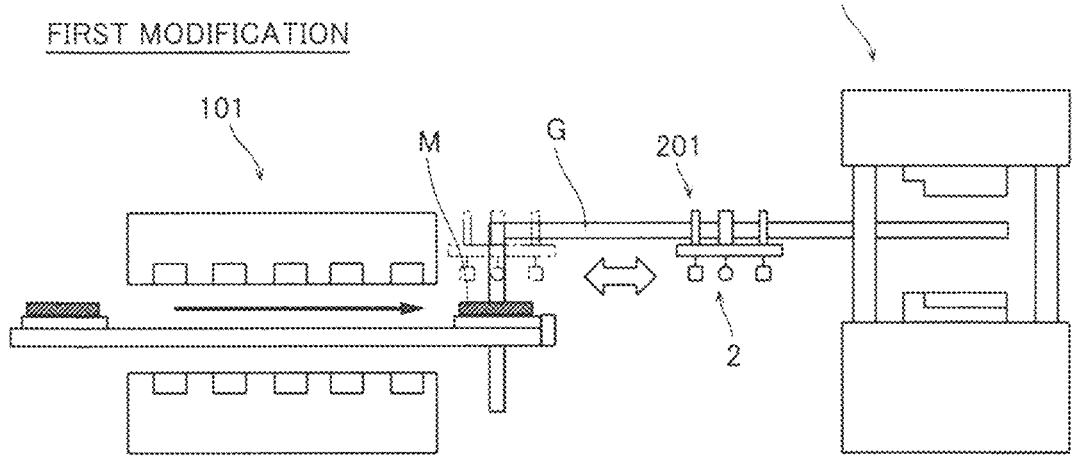
FIG. 10 is a schematic view showing a conveyance device according to a first modification of the embodiment.

For example, while the articulated robot is used as the conveyance device body according to the present invention in the aforementioned embodiment, the present invention is not restricted to this. According to the present invention, as in a first modification shown in FIG. 10, a device 201 that operates horizontally and vertically with respect to a guide rail G may alternatively be used as the conveyance device body according to the present invention. Alternatively, although not shown, an orthogonal robot may be used as the conveyance device body according to the present invention.

Figure 11:
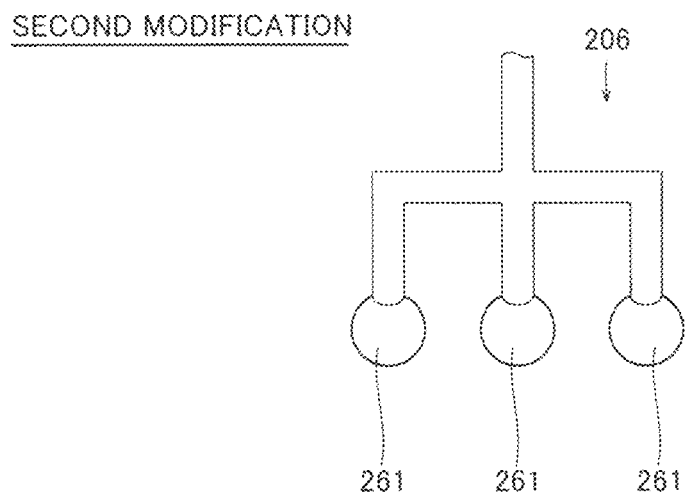
FIG. 11 is a schematic view showing a pressing mechanism according to a second modification of the embodiment.

While one pusher is provided on one pressing mechanism in the aforementioned embodiment, the present invention is not restricted to this. According to the present invention, as in a second modification shown in FIG. 11, for example, a plurality of pushers 261 may alternatively be provided on one pressing mechanism 206.

Figure 12:
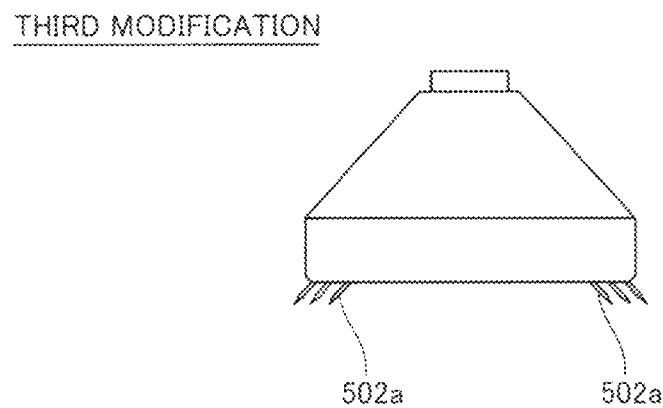
FIG. 12 is a schematic view showing holding needles of a holder according to a third modification of the embodiment.

While the holding needles are arcuate in the aforementioned embodiment, the present invention is not restricted to this. According to the present invention, as in a third modification shown in FIG. 12, for example, holding needles 502a may alternatively be linearly formed. In addition to this, holding needles each may alternatively be formed in a shape obtained by dividing an ellipse or a quadratic curve, for example.

Figure 13:
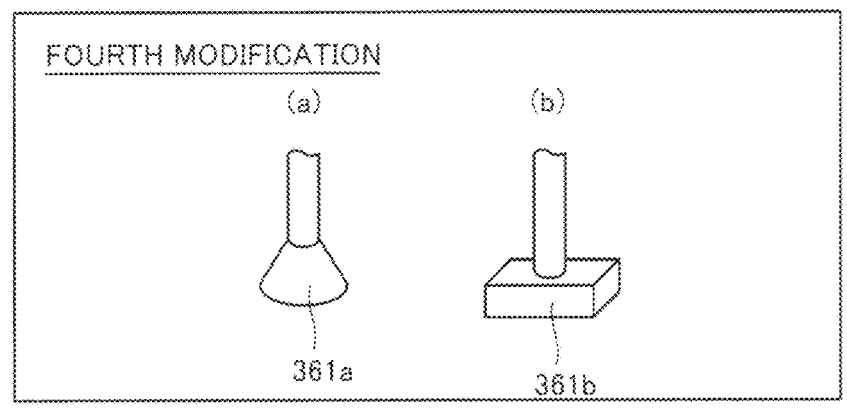
FIG. 13 is a schematic view showing pushers according to a fourth modification of the embodiment.

While the pushers each have a spherical shape or a round bar shape in the aforementioned embodiment, the present invention is not restricted to this. According to the present invention, as in a fourth modification shown in view (a) of FIG. 13, for example, a pusher 361a may alternatively have a conical shape or a pyramidal shape. Alternatively, a pusher 361b may have a plate shape (rectangular parallelepiped shape), as shown in view (b) of FIG. 13.

Figure 14:
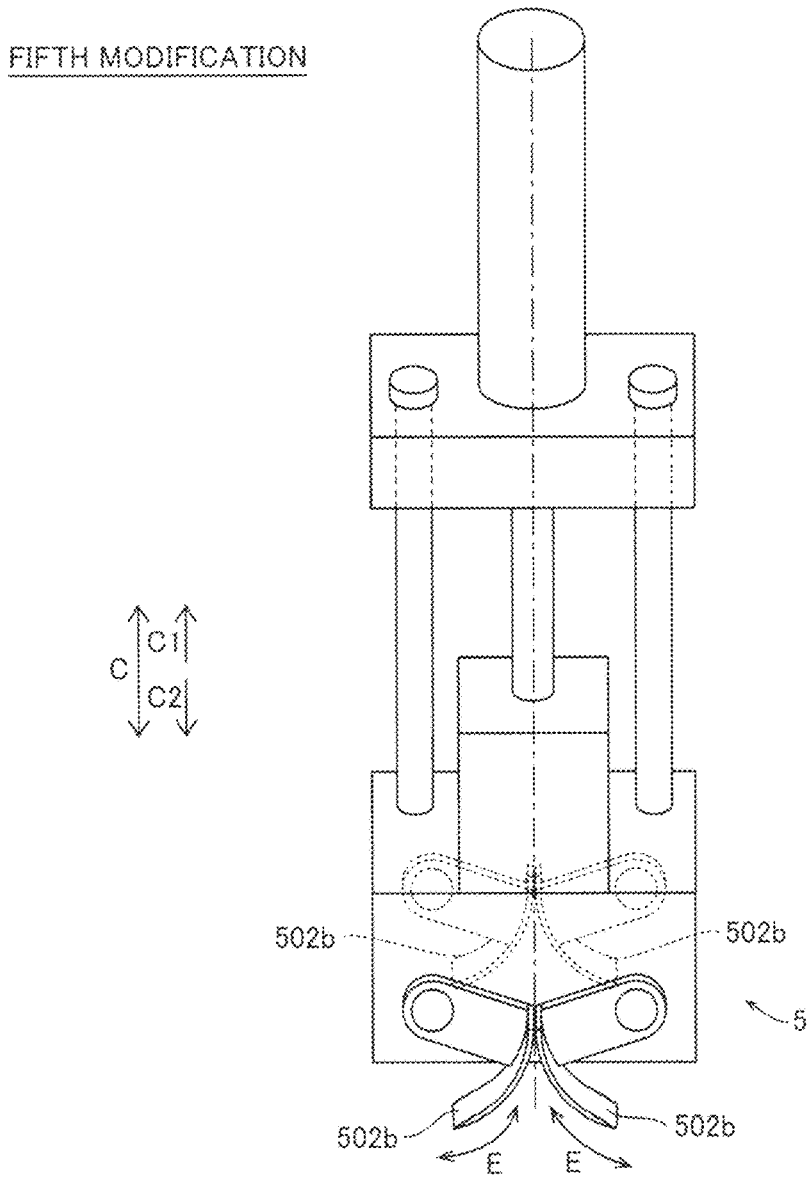
FIG. 14 is a schematic view showing holding needles of a holder according to a fifth modification of the embodiment.

While the holding needles each are in the form of an elongated circular cone (a tapered shape having a circular cross-section) in the aforementioned embodiment, the present invention is not restricted to this. According to the present invention, as in a fifth modification shown in FIG. 14, for example, holding needles 502b each may alternatively be in the form of a plate (a tapered shape having a rectangular cross-section).

While the holding needles each are quarter arcuate in the aforementioned embodiment, the present invention is not restricted to this. According to the present invention, the holding needles each may alternatively be one-fifth arcuate, for example.

While the plurality of holding needles are provided on one holder in the aforementioned embodiment, the present invention is not restricted to this. According to the present invention, one holding needle may alternatively be provided on one holder.

While a vertical closing molding machine is used for press molding in the aforementioned embodiment, the present invention is not restricted to this. According to the present invention, a horizontal closing molding machine may alternatively be used for press molding, for example.

While the plurality of pressing mechanisms are provided in the conveyance device in the aforementioned embodiment, the present invention is not restricted to this. According to the present invention, one pressing mechanism may alternatively be provided in the conveyance device.

While the head body has a framework structure in the aforementioned embodiment, the present invention is not restricted to this. According to the present invention, the head body may alternatively be in the form of a flat plate, for example.

While the joint (distal-end joint) according to the present invention is provided on the conveyance device body in the aforementioned embodiment, the present invention is not restricted to this. According to the present invention, the joint (distal-end joint) according to the present invention may alternatively be provided on the attachment of the head body.

While the holders include the holding needles that hold the molding material by sticking thereinto in the aforementioned embodiment, the present invention is not restricted to this. According to the present invention, the holders may alternatively include clips that hold the molding material by gripping, for example.

While the molding material does not come into contact with the molds during the preforming in the aforementioned embodiment, the present invention is not restricted to this. According to the present invention, the molding material may alternatively come into contact with the molds during the preforming.

What is claimed is:

1. A conveyance device that supports a melted and softened molding material containing reinforcement fibers and a thermoplastic resin, conveys the molding material between a pair of molds that have been opened, and places the molding material on one of the pair of molds, comprising:
   a plurality of holding mechanisms;
   one or more pressing mechanisms, wherein:
   the holding mechanisms each include a holder that holds the molding material and a holder movement mechanism that moves the holder, and
   the pressing mechanisms each include a pusher that comes into contact with and pushes the molding material and a pusher movement mechanism that moves the pusher; and
   a controller that controls an operation of conveying the molding material and an operation of placing the molding material, wherein the controller:
   controls the holding mechanisms to hold each portion of the molding material by a plurality of the holders and convey the molding material between the pair of molds while supporting the molding material in a state where the pusher does not come into contact with the molding material,
   controls the holding mechanisms and the pressing mechanisms to start preforming for pushing the molding material held by the plurality of holders by the pusher to follow the one of the pair of molds and deforming the molding material into a predetermined shape before the molding material comes into contact with the one of the pair of molds, and
   controls the holding mechanisms to release holding of the molding material, on which the preforming has been performed, by the holders and place the molding material on the one of the pair of molds.

2. The conveyance device according to claim 1, further comprising a conveyance device body and a conveyance head attached to the conveyance device body and provided with the plurality of holding mechanisms and the one or more pressing mechanisms.

3. The conveyance device according to claim 2, wherein the conveyance head includes a head body having a mesh-like framework structure to which the plurality of holding mechanisms and the one or more pressing mechanisms are attached.

4. The conveyance device according to claim 3, wherein the head body includes an attachment provided in a vicinity of an edge of the head body having the mesh-like framework structure and attached to the conveyance device body.

5. The conveyance device according to claim 4, wherein the conveyance device body or the attachment includes a joint, and
   the head body is attached to the conveyance device body via the joint.

6. The conveyance device according to claim 2, wherein the holder movement mechanism includes a holder rotation restriction mechanism that restricts rotation of the holder about a direction in which the holder is moved by the holder movement mechanism and maintains an orientation of the holder in a predetermined direction, and
   the pusher movement mechanism includes a pusher rotation restriction mechanism that restricts rotation of the pusher about a direction in which the pusher is moved by the pusher movement mechanism and maintains an orientation of the pusher in a predetermined direction.

7. The conveyance device according to claim 2, wherein the holding mechanisms provided on the conveyance head are larger in number than the pressing mechanisms provided on the conveyance head.

8. The conveyance device according to claim 2, wherein the conveyance device body is an articulated robot.

9. The conveyance device according to claim 1, wherein each of the holder movement mechanism and the pusher movement mechanism includes a pneumatic cylinder.

10. The conveyance device according to claim 1, wherein the holding mechanisms each include a slide mechanism that slides the holder in a direction that intersects with a direction in which the holder is moved by the holder movement mechanism.

11. The conveyance device according to claim 10, wherein
the slide mechanism includes a pneumatic cylinder.

12. The conveyance device according to claim 10, wherein
the plurality of holding mechanisms each including the slide mechanism include a first holding mechanism including a first holder and a first slide mechanism that slides the first holder in a first direction, a second holding mechanism including a second holder and a second slide mechanism that slides the second holder in a second direction substantially perpendicular to the first direction in a planar view, and a third holding mechanism including a third holder and a third slide mechanism that slides the third holder in a third direction different from the first direction and the second direction in the planar view.

13. The conveyance device according to claim 1, wherein
the pusher has a spherical shape, a conical shape, a pyramidal shape, a rod shape, or a plate shape.

14. A conveyance device that supports a melted and softened molding material containing reinforcement fibers and a thermoplastic resin, conveys the molding material between a pair of molds that have been opened, and places the molding material on one of the pair of molds, comprising:

a plurality of holding mechanisms; and one or more pressing mechanisms, wherein:

the holding mechanisms each include a holder that holds the molding material and a holder movement mechanism that moves the holder, the pressing mechanisms each include a pusher that comes into contact with and pushes the molding material and a pusher movement mechanism that moves the pusher, and the holder includes one or more holding needles that hold the molding material by sticking into the molding material.

15. The conveyance device according to claim 14, wherein
the holder includes a plurality of the holding needles, and
the plurality of holding needles are disposed symmetrically with respect to a centerline of the holder that extends in a direction in which the holder is moved by the holder movement mechanism.

16. The conveyance device according to claim 14, wherein the holding needles are arcuate, and are arcuately pivotable.

* * * * *